United States Patent [19]

Mattimoe et al.

[11] 4,101,056

[45] Jul. 18, 1978

[54] TEMPERATURE-COMPENSATING PETROLEUM PRODUCT DISPENSING UNIT

[75] Inventors: George E. Mattimoe, 953 Wainiha St., Honolulu, Hi. 96825; Michael P. Gouveia, Honolulu, Hi.

[73] Assignee: George E. Mattimoe, Honolulu, Hi.

[21] Appl. No.: 703,465

[22] Filed: Jul. 8, 1976

Related U.S. Application Data

[63] Continuation-in-part of Ser. No. 581,229, May 27, 1975, abandoned.

[51] Int. Cl.[2] .......................... G01F 1/00; G01F 15/02

[52] U.S. Cl. .......................... 222/26; 222/1; 73/194 E; 235/92 FL; 364/571

[58] Field of Search .......................... 222/1, 2, 71, 25, 26, 222/27, 28; 73/194 R, 194 E, 194 M, 233; 235/92 FL, 151.34; 250/231 SE; 40/52 R

[56] References Cited

U.S. PATENT DOCUMENTS

| | | | |
|---|---|---|---|
| 1,876,512 | 9/1932 | Pfening et al. | 222/27 |
| 3,169,185 | 2/1965 | Nines | 235/92 FL |
| 3,518,664 | 6/1970 | Taylor | 40/52 R X |
| 3,749,283 | 7/1973 | Nelson | 222/27 |
| 3,897,887 | 8/1975 | Goldberg | 222/26 |
| 3,905,229 | 9/1975 | Togo et al. | 73/194 E |
| 3,927,800 | 12/1975 | Zinsmeyer et al. | 222/26 |
| 3,949,207 | 4/1976 | Savary et al. | 222/26 X |

*Primary Examiner*—Allen N. Knowles
*Assistant Examiner*—Joseph J. Rolla
*Attorney, Agent, or Firm*—Owen, Wickersham & Erickson

[57] ABSTRACT

Method and apparatus suitable for the retail sale of gasoline (as well as for other fluid delivery systems) in terms of standard quantities (e.g., gallons) at a standard temperature, such as 60° F. The apparatus for retail gasoline sale provides a pressure differential for moving the gasoline from a storage tank to a hose, and it includes a metering device preferably having a rotating shaft and a shaft-angle encoder for generating a positive angle continuous, electrical signal as a function of the shaft angle output. The instantaneous temperature of the gasoline in the nozzle is sensed and a thermal value signal generated from it several times per second. A rapid electronic computer computes from the continuous gallonage signal and the thermal value signal, at intervals of several times per second, the gallonage corrected to standard gallons at 60° F. and actuates a display of the computed dispensed gallons in terms of standard gallons at 60° F., and the money price thereof in terms of standard gallons at 60° F. The electronic computer has sufficient capacity to provide calculations for two similar or different gasoline products being simultaneously dispensed through a "twin hose" type of dispenser. Parallel display, front and back, is also a simultaneous attribute for the single hose dispenser as well as the twin hose dispenser.

43 Claims, 16 Drawing Figures

FIG. 1
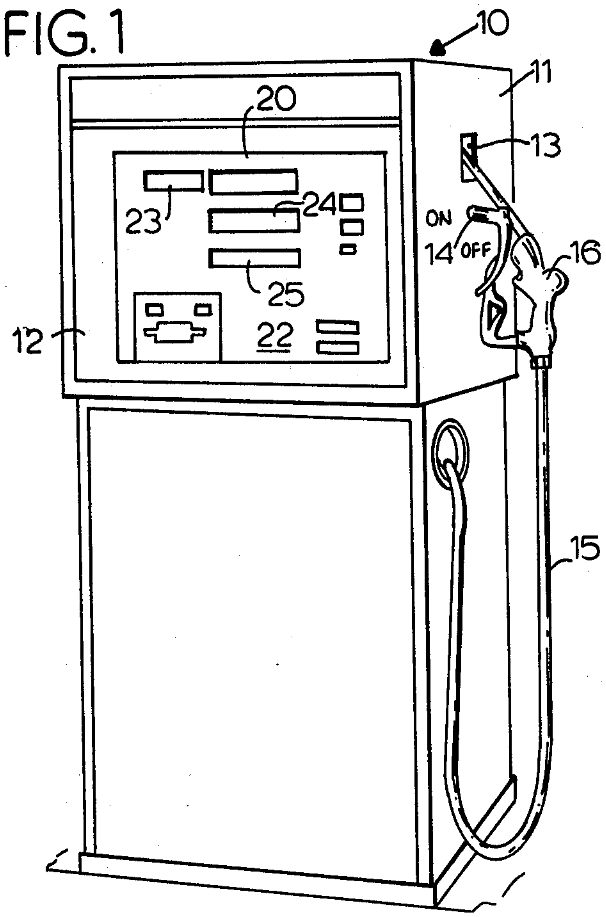
FIG. 3
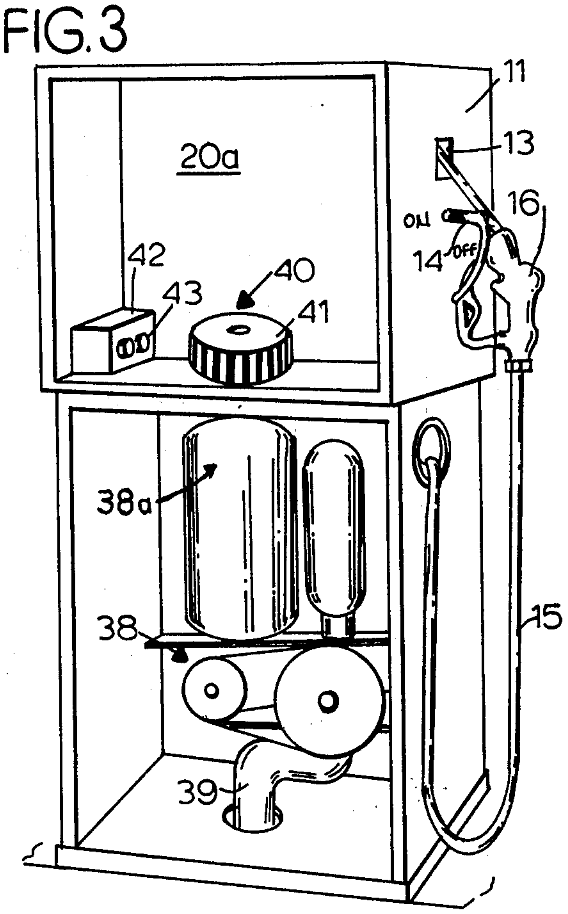
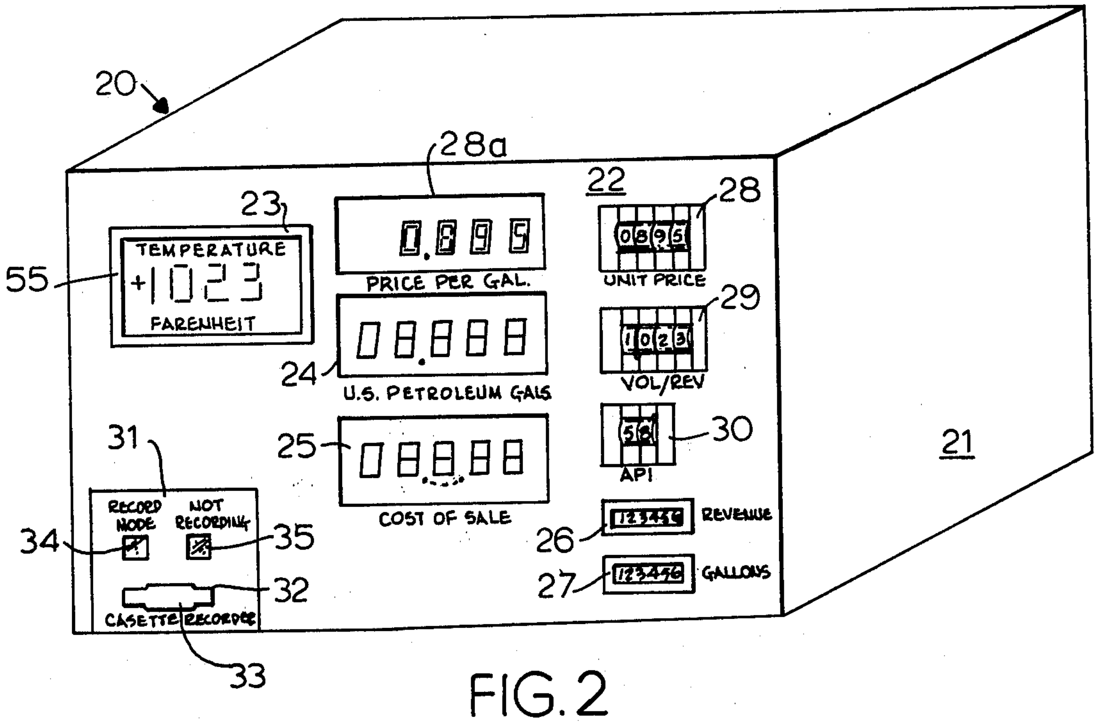
FIG. 2

INPUT SUB-SYSTEM

TEMPERATURE-COMPENSATING PETROLEUM PRODUCT DISPENSING UNIT

REFERENCE TO RELATED CO-PENDING APPLICATION

This application is a continuation-in-part of application Ser. No. 581,229, filed May 27, 1975, now abandoned.

INTRODUCTION

This invention relates to the accurate delivery of liquids, including retail and wholesale delivery of gasoline or any other petroleum product. For example, the delivery may be from the retail dispenser to the ultimate consumer's vehicle gasoline tank, or into any other container, in terms of volume corrected by a digital computer to a standard temperature. Thus, the delivery may be in terms of U.S. petroleum gallons of 231 cubic inches at 60° F., or its multiples or decimal submultiples; and by the simple resetting of a digital thumbwheel switch, the invention provides for delivery in terms of imperial gallons or SI liters or other volumes or their multiples or decimal submultiples at 60° F. or 15° C., or any other stipulated temperature.

BASIC PURPOSE OF THE INVENTION

This invention assures the consumer or other recipient that whatever the given liquid product and whatever its actual temperature or density at the time of sale, he will receive an equitable and constant transfer of energy capability in terms of net BTU's per gallon or in terms of any other acceptable unit of measure.

The energy of the fuel (whether expressed in BTU's per gallon, or any other acceptable unit of measure) provides the basic propulsive power to diesel, rotary, internal combustion and jet engines, among others. The energy is really what the consumer pays for. Further, comparative mileage claims (or fuel economy) in the United States could be made accurately, and should be made on the basis of the BTU's per gallon, not on the erroneous basis of a mere constant volume at whatever temperature. The purpose of this invention is to assure transfer of constant energy per defined volume unit.

This invention assures that, irrespective of the given product, its temperature, or its density, the transfer from the seller to the buyer will be based on an equitable and constant mass, in terms of weight per gallon, or other acceptable unit of measure.

The function of assuring a fair transfer based on an equitable transfer of energy capabilities of a fluid is an important feature of this invention. Heretofore, it has been unavailable to the consuming public, although several approaches and devices have been utilized in intra-industry petroleum product transfers. Even there, each of the prior art devices used in the intra-industry transfers suffered from lack of precision and fidelity and, in reality, was an approximating device not comparable to the present invention, which can be used in that environment, too, with improved results. In any event, the benefits derived from constant energy and constant weight-per-gallon transfers have been limited to intra-petroleum industry transfers and transfers to certain preferred accounts. These benefits have never been extended to benefit the ultimate consumer.

This invention enables rectification of a long-established inequity and assures that all parties to a petroleum product transaction, at all levels in the distribution hierarchy and particularly in the transfer to the ultimate consumer, are dealing in and receiving the same amount of energy per unit of defined measure, and the same weight per unit of defined measure irrespective of the apparent volume.

BACKGROUND OF THE INVENTION

Shortly after the discovery of oil in Pennsylvania, it became apparent that the volume and density of each petroleum product changed with a change in temperature.

During the period of 1912–1916, Drs. H. W. Bearce and E. L. Peffer of the National Bureau of Standards initiated cooperative work with the petroleum industry to establish and define "Density and Thermal Expansion of American Petroleum Oils," and this research and development effort was published as National Bureau of Standards Publication, *Technilogic Paper Number* 77, on Aug. 26, 1916. The data in this publication were superseded by National Bureau of Standards publication C-57, entitled *United States Standard Tables for Petroleum Oils,* published on May 11, 1916. Publication C-57 was superseded by publication C-154, entitled, *National Standard Petroleum Oil Tables,* also a National Bureau of Standards publication, which issued May 29, 1924. In its tables, the original limited range of specific gravity of 0.620 to 0.960 was widened to a range from 0.600 to 1.000, and the original 30° to 120° F. temperature range was widened to a range of 0° F. to 195° F. An abridged C-154 was issued Oct. 8, 1925 as a National Bureau of Standards publication and included an extended temperature range up to 250° F., the tables representing an abridged version with only six cells representing API gravities of 22°, 44°, 58°, 72°, 86°, and 91° API.

The publication C-154 was superseded by publication C-410, entitled, *National Standard Petroleum Oil Tables,* issued as a National Bureau of Standards publication on Mar. 4, 1936. Its tables, with the exception of the specific gravity reduction tables, were extended to include oils having specific gravities from 1.000 to 1.076 (10° to 0° API). The following year C-410 (supplement), entitled, *Abridged Volume Correction Table for Petroleum Oils,* superseded the abridged C-154, issuing on Apr. 20, 1937. This supplement contained new entries corresponding to 6° API and 97° API, and the temperature range of the cell for 6° and 22° API was extended to 200° F. Publication C-410 served the needs of the petroleum industry for 18 years, after which time it was withdrawn, in favor of the currently established ASTM-IP D 1250 Petroleum Measurement Tables.

ASTM-IP D 1250 consists in the main of (34) separate tables for correcting petroleum products to 231 cubic inches at 60° F., or other derived units of measurement.

The National Bureau of Standards involvement in generating petroleum products volume-correction tables spanned forty-two years, and their efforts resulted in the following agencies adopting or specifying their defined standards:

(1) The United States Treasury Department, through its Bureau of Customs, in 19 CFR 1.1-12.10(B) requires imported petroleum products to be declared in terms of U.S. Petroleum Gallons of 231 cubic inches at 60° F., and admonishes all importers to utilize D-1250-6 for such purposes;

(2) The American Petroleum Institute has adopted as recommended industry standard, API 2540, also called D-1250;

(3) The American Society for Testing and Materials has adopted D-1250 as the recommended industry standard;

(4) The American National Standards Institute has adopted, as recommended industry standard, ANSI 711.83 (which is D-1250);

(5) The International Standards Organization has adopted, as recommended international standard, *ISO* R-91 (which is essentially D-1250 with SI, or metric counterparts included);

(6) The Institute of Petroleum, London, has adopted as recommended industry practice IP-200 (which is essentially D-1250, except that imperial measurement was recognized, prior to England undertaking its transition to SI);

(7) The Federal Trade Commission has adopted as mandatory standard, in 16 CFR, 500.8(B), relating to packaged petroleum products a U.S. Petroleum Gallon of 231 cubic inches at 60° F., the exact same definition contained in each standard cited above (all of which are D-1250);

(8) In addition, the Federal Specifications for automotive gasoline, VV-G-76*b*, in 6.2 calls for: "The unit of purchase is one U.S. Gallon of 231 cubic inches at 60° Fahrenheit." (which is D-1250);

(9) VV-F800*a*, the Federal Specification for Diesel Fuel Oil stipulates in 6.2, "Quantity in Gallons. This material should be purchased by volume, the unit being a U.S. Gallon at 60° Fahrenheit." (which is D-1250);

(10) VV-F815*c*, the Federal Specification relating to Burner Fuel Oil in 6.2(c), "Quantity of Oil required. The fuel oil should be purchased by volume, the unit being one U.S. Gallon of 231 cubic inches at 60° Fahrenheit." (which is D-1250);

(11) In the State of Hawaii, by Statute law Chapter 486D, all petroleum products, including retail sales to the ultimate consumer shall be in terms of U.S. Petroleum Gallons of 231 cubic inches at 60° Fahrenheit (which is D-1250).

The thermal characteristics of petroleum products at the time of sales to the ultimate consumer presented a hitherto ignored major problem. This may seem astounding in view of the above-cited data and research. Obviously, it is a serious discrimination against most, if not all, ordinary consumers of gasoline.

To illustrate the magnitude of the problem, consider the characteristics of a so-called "regular, unleaded" gasoline having a density of 58° API. At 60° F. one gallon of this gasoline occupies 231 cubic inches of space, contains 117,234 net BTU's of energy, and it weighs 6.216 pounds.

If one cools this same 231 cubic inches to (0° F.), it contracts into a more dense product occupying less space, i.e., 222.940 cubic inches; however, it still contains 117,234 net BTU's of energy and it still weights 6.216 pounds If one heats this same 222.940 cubic inches of (0° F.) gasoline back to 60° F., it will again occupy 231 cubic inches, it still contains 117,234 net BTU's and still weighs 6.216 pounds, and if one continues heating the 231 cubic inches of 60° F. gasoline, up to 150° F., it expands into a less dense product occupying more space, i.e., 244.440 cubic inches; however, it still contains 117,234 net BTU's of energy and it still weighs 6.216 pounds.

Three distinct facts are thus established:

(1) Energy per gallon does not change with temperature;

(2) Weight per gallon does not change with temperature;

(3) Volume per gallon does change with temperature.

Since it has been determined that energy and weight are unaffected by temperature change, but that volume varies with temperature change, e.g., (0°–150° F. reflects a change in space occupied from 244.440 cubic inches to 222.940 cubic inches, a difference of 21.5 cubic inches) it is apparent that delivering constant volume, irrespective of product temperature, does not assure accurate delivery or even factual delivery of a standard U.S. petroleum gallon, unless the temperature happens to be 60° F.

In the conditions cited, when a retailer delivers 231 cubic inches of (0° F.) gasoline, he shorts himself 4090 net BTU's of energy and 0.22 pounds of weight. The consumer is the beneficiary of inaccurate measurement and unjust enrichment at the expense of the retailer. However, when the retailer delivers 231 cubic inches of 150° F. gasoline, the retailer shorts the consumer by 6820 net BTU's and 0.36 pounds in weight. The retailer is then the beneficiary of inaccurate measurement and unjust enrichment at the expense of the consumer. These factors, moreover, do not balance themselves out. For example, petroleum products delivered in some warm-climate areas are nearly always above 60° F. Thus, current gallon measurement by uncompensated volume is always unfair to many.

Under currently advertised mileage claims, there is no way that the miles derived from 231 cubic inches of 0° F. gasoline can equitably be compared to the miles derived from 231 cubic inches of 150° F. gasoline, since there is an energy difference of 10,910 net BTU's between the two alleged gallons, corresponding to a difference of 0.58 pounds of gasoline.

This invention precludes continuance of the current unsavory practice and assures an equitable energy base for making valid mileage claims.

SOME BASIC TECHNICAL PROBLEMS ENCOUNTERED

It might be thought that, with all the tables available, temperature compensation would be a simple matter. It is not.

In a typical filling station, a check from time to time of the ambient temperature and a change in scale at the pump would not give accurate results, even if such a change were easy. The fact is that the ambient temperature at or near the pump is not the temperature of the liquid itself, and that is the critical temperature. Moreover, to make changes in scale on filling station pumps now available, to compensate for temperature, is virtually impossible.

It might be thought that the temperature of the gasoline in the filling station storage tanks would be a suitable basis for making temperature compensation, but that is not true either, for the temperature often changes considerably as the fuel seeks thermal equilibrium with its underground environment, which condition is seldom if ever achieved due to the constant withdrawal and addition of fuel, usually differing in temperature, and as the fuel moves through conduits on the way to the delivery nozzle. Actually, the temperature at the nozzle itself — or as close to that as one can get and still be practical — is the important temperature, and that may change from moment to moment. We have found that sensing the temperature even as often as once per second is usually inadequate, even if temperature compensation could be made almost instantaneously.

Therefore, it is necessary to provide temperature compensation at the point of delivery and to update the temperature reading at that point as often as possible, at least several times per second, in order to obtain the desired accuracy.

The present invention, therefore, is directed to a system able to sense the temperature at the point of delivery — e.g., the nozzle at the end of the hose for a filling station pump — and to sense and signal that temperature several times per second.

To maintain that scale of accuracy, it is important that the measurement and display of the gasoline be as nearly continuous as possible, as well as being accurate. For this purpose, we have found that current reliance on mechanical analog systems and mechanical computers leads to significant inaccuracies.

Contemporary mechanical computers have few, if any, additional capabilities over what they had when originally developed some 25 years ago. For example, the 10-gallon nominal (9.9 gallon actual) delivery capacity has been expanded to 100 gallons, nominal (99.9 gallon actual), and the variator setting (price per unit) now includes $0.999 per gallon multiplication capabilities. However, the inclusion of additional mechanical display and computing capability have increased the energy (torque) demands necessary to start drive (e.g., four foot-pounds approximately), and intermittently engage and actuate successive 10-to-1 ratio Geneva motions, with a resultant energy drain on the output shaft of the retail gasoline dispenser meter. When the rotational speed of the "cents" wheel for a fixed volume-flow approaches the critical point, the total unit becomes velocity sensitive, consequently calibration over a constant-volume range becomes increasingly difficult, if not impossible, at flow rates other than that at which the device was calibrated.

Irrespective of which flow rate was established during calibration, a mechanical computer is insensitive to product temperature, and, consequently, is only correct when calibrated at 60° F. with a product whose temperature is 60° F. and when utilized to sell a product whose temperature is actually 60° F. This is a very improbable set of conditions. Accordingly, most retail gasoline dispensers installed throughout the nation are, by definition, incorrectly calibrated, and, worse, incapable of being correctly calibrated in their ambient environment, because they are, by design, temperature insensitive.

The inclusion of a pulser, in addition to the mechanical computer obviously cannot cure the infirmities of either but only add to each other.

For example, one of the best gasoline dispensing systems in current use employs a mechanical computer that has approximately four foot-pounds of starting torque, has a somewhat lower running torque, and reflects an additional torque (high and spike-like on a graph) each time an additional Geneva motion is encountered. The use of gear trains, right-angle drive elements, and several positively coupled Geneva-drive motions for each of the right-angle take-off shafts, with a 10:1 ratio between each decade, sets up significant inaccuracies. These inaccuracies are in no way reduced, and in fact art slightly increased, by adding on to the mechanical system electronic devices which convert the mechanical signals, digit by digit of each Geneva motion, into pulses, one for volume, and another for cost. The pulses are then reshaped through electronics, and the results are ultimately displayed. Pulsers themselves are noisy electronically, and they have no inherent referent. Such systems, which are about the best the prior art has done, are incapable of high resolution of the output of the fuel-metering device. These prior art systems employ simple on-off rotary switches, utilizing a disc located between a light source (usually a light-emitting diode) on one side, and a light-sensitive receiver on the other. The disc is fitted with a plurality of slots spaced equidistant apart and concentrically located, so as to allow and interrupt the light reception. With the disc rotating, each time a slot passes between the light source and the receiver, a pulse is transmitted. Between slots no pulse is transmitted.

Unfortunately, a major infirmity of such pulsers is their "on-off" simplicity. If gasoline delivery is stopped when a light-emitting diode is aligned at the edge of a slot, the disc may fluctuate back and forth because of mechanical vibration and run up a false, conceivably even an adtronomical, bill. Moreover, the light-sensitive receiver is incapable of differentiating between a pulse generated as a function of disc rotation (where light is transmitted through the different slots) and a pulse generated as a function of mechanical vibration (where the light is transmitted through the same slot as the disc vibrates back and forth). The pulser is similarly incapable of differentiating between clockwise and counterclockwise rotation, and this incapability contributes to the infirmity cited above.

What is needed is a substantially continuous system rather than an incremental system, a system with a referent for each dispensing operation. In other words, a referent-less dispensing system may start at any point between the smallest legal unit of reference (e.g., 0.1 gallon and 1 cent) and the dispensing of very little gasoline may cause the registry of the smaller units, depending on where the previous dispensing stopped. A system employing a referent starts each customer out from a zero reference point. A continuous system measures continuously and stops at the point of measurement, even though it may lie in between two of the smallest units of measurement. In the preferred system these smallest units would be 0.001 gallon and 0.01 cent.

Further, reliance on pulses, as in some flow meters, in addition to being electronically noisy and vibration-sensitive, also require an accurate input, and current gasoline pumping equipment at the filling station does not involve pulse generators or pulse transmitters in association with their positive displacement or other types of meters.

Again, it is not sufficient to superimpose an electronic computing system on an inherently inaccurate mechanical metering system and an inherently inaccurate or unduly slow temperature measurement system.

Complete elimination of mechanical computers in favor of a pulser and its allied electronics, can eliminate the problems incident to the mechanical computer and can enhance the fidelity of the constant volume delivery of a contemporary retail gasoline dispenser. Additional circuitry can improve the pulsers infirmities. For example, the inclusion of a second (light-emitting diode) light source and receiver, 90° out of phase with the one mentioned above, will resolve the ambiguity of rotation problem. The inclusion of a third light source and receiver another 90° out of phase, plus half the width of a light transmitting slot in the disc can minimize the vibration problem by creating an equal but opposite or canceling pulse.

While this invention can be embodied in equipment that is less accurate that its inventors believe satisfactory, and while it may be that such inaccuracy will be legally tolerated for some time to come, yet the best embodiments of this invention known to the inventors at this time are able to achieve a high degree of accuracy that basically gives both the supplier and the purchaser what they bargained for and that does so without undue cost to either.

To obtain what the inventors believe to be the proper degree of accuracy, the positively driven mechanical computers and their analog display are replaced with a system electronically coupled to a shaft-angle-encoded metering system.

Another source of inaccuracy is disregarding the second power term in the temperature-volume equation:

$$V_{ST} = (1 + A'\overline{\Delta T} + B'\overline{\Delta T}^2)V_T$$

where:

$V_{ST}$ = the volume at a standard temperature $V_T$ = the volume at the ambient temperature $\overline{\Delta T}$ = the difference in temperature between $V_{ST}$ and $V_T$ A' = a coefficient experimentally determined by the National Bureau of Standards B' = another coefficient experimentally determined by the National Bureau of Standards To base computation on the equation on the basis that $B'\overline{\Delta T}^2$ is zero or is insignificant and may be totally disregarded, leads, in many systems, to significant errors.

The present invention can be practiced by calculating on the basis that $B'\overline{\Delta T}^2$ is to be disregarded, but there are no savings whatever in doing so, and the present invention makes it convenient and wholly practical to incorporate the term $B'\overline{\Delta T}^2$ in all calculations. Initial programming is little trouble when quantity production of the mini-computer is embarked on, and the cost of calculating, once such programming is in the system, is practically nil.

Utilizing the $V_{ST} = (1 + A'\overline{\Delta T} + B'\overline{\Delta T}^2)V_T$ formula (with both the A' and B' cited coefficients) enhances the accuracy of delivery over the retail range, which by legal definition is 1 to through 99 gallons. (N.B.S. Publication Handbook 44, fourth edition, under section on "Liquid Measuring Devices".)

Objects of the Invention

A general object of this invention is to provide a precision automatic device for continuous automatic temperature compensation at delivery of petroleum products, especially those sold at retail.

Another object of the invention is to provide a system and method for determining the actual energy measure and the cost per energy of the gasoline delivered to the consumer.

Another object of the invention is to provide a system and method of petroleum product delivery whereby, if and when this nation adopts the metric system, the device can be changed to deliver SI liters merely by resetting a thumb wheel switch. This feature has a distinct advantage over contemporary gasoline dispensers which would require a major retrofit with a mechanical reductor; hence, this invention makes possible a single design compatible throughout the metric nations of the world and those nations utilizing the U.S. Customary System of Weights and Measures.

Another object of the invention is to provide a complete system which is readily retrofittable to all existing retail gasoline and diesel dispensers now installed throughout the nation and the world. This represents some 1,600,000 dispensers in the U.S. alone.

Another object of the invention is to provide a complete system and method which continuously measures the product being delivered and senses its temperature several times per second and solves times each second the standard volume formula $$V_{ST} = 1 + A'\overline{\Delta T} + B'\overline{\Delta T}^2)V_T$$

with electronic dispatch. Speed is an integral requirement to accuracy in measuring any flowing product, lest another variable be introduced.

Thus, the flow rate of contemporary retail gasoline dispensers is generally in the order of 35 gallons per minute, depending upon the nozzle latch position used. Approximately 6/10 gallon of gasoline is entrapped in the delivery hose, this product being separated from the elements by approximately ⅛ inch of black neoprene; so it is extremely susceptible to temperature increases and decreases. The approximately 141 cubic inches entrapped in a 1 inch diameter by 15-foot long hose expands three cubic inches over a temperature change of 35° F. Three cubic inches is the legal point of rejection for a five gallon delivery throughout the U.S. when using a new dispenser.

Hence, speed of resolution is of the essence, or the elevated temperature product would be delivered into a Weights and Measures Inspector's five-gallon prover (on one delivery with its apparent 1155 + 3 or 1158 cubic-inch delivery, and yet on the second proving run, with the temperatures of the product in the hose now nearer the underground supply temperature, the dispenser would deliver 1155 cubic inches, and the gasoline dispenser could be rejected from use, because of slow response time to the temperature change.

Another object of this invention is to provide an electronic computation and readily visible seven-bar display system whereby the unit cost per measure can readily be seen, set and changed, as required, as by readily adjustable thumb wheel switches. This feature solves a current problem wherein many contemporary designed and installed retail gasoline dispensers are incapable of and cannot have their variator setting above 49.9 cents/gallon and all are incapable of settings above 99.9 cents/gallon which, in view of current trends, may shortly prove inadequate for retail pricing, so that retailers will again be compelled to set their cost per gallon at one-half of the actual value and then argue with the consumer that the figure shown in the cost-of-sale aperture must be doubled.

Another object of this invention is to provide a system with readily adjustable means for setting the API gravity, as by thumb wheel switches. Such switches can then establish digitally the density for a given product, as is dispensed from the retail gasoline or diesel fuel dispenser. Product gravity is a function of its crude and refinery product quality control and varies little in a given product line in a given locale. This factor is therefore treated as a constant (although it is manually variable) and is one of the required parameters for accurate measurement of gasoline and other petroleum products. Contemporary gasoline and diesel dispensers ignore this variable entirely, just as they ignore temperature change, and such ignorance contributes to inaccurate measurement.

To illustrate: A U.S. Petroleum Gallon of 231 cubic inches at 60° F., which is normally referred to as a "regular type" gasoline, of 58° API, will change its volume or space requirements by 21.5 cubic inches with a temperature change from 0° to 150° F. However, with a "premium type" gasoline of 72° API and 231 cubic inches at 60° F., the volume will change by 25.172 cubic inches over a temperature change of 0°-150° F. Thus, it is apparent that, while the thermal coefficient of expansion for each product is nominally a straight line, it is different for each product, and the difference between "regular type" and "premium type" over the temperature and density ranges cited, is beyond legal tolerance for all fifty States of the United States of America.

Another object of this invention is to minimize or eliminate losses due to inaccurate measurement and pump-down time due to Weights and Measures' enforcement of State laws.

For example, the States of Oregon and Hawaii require gasoline dispensers to be with ±2.5 cubic inches when initially installed and ±5.0 cubic inches under maintenance tolerance, on a test draft or customer delivery of 1155 cubic inches. Any temperature, and/or density change resulting in a volume change of ±2.5 cubic inches on a test draft or consumer sale of 1155 cubic inches will subject the gasoline dispenser to legal rejection (red-tagging and security sealing) so as to preclude its use, and in addition, subject the "user" or "dealer" to penalties under law for fraudulent short delivery, or in the case of over-delivery for unfair trade practice. Yet the gasoline temperature change, necessary to cause a dispenser to deliver a volume beyond legal tolerance, is very small in the absence of this invention; the allowable error of ±2.5 cubic inches on a delivery of 1155 cubic inches/gallon (or one part in 462). Hence, a volume of 230.500 cubic inches will, when delivering five gallons at one delivery, constitute an illegal delivery in Hawaii and Oregon. This change can be caused by a $\overline{\Delta T}$ of 3.5±° F., so that actual gasoline temperatures at which the dispenser becomes illegal in this illustration are 56.4° F. on the low side and 63.4° F. on the high side.

In all other States, the allowable tolerance for devices under similar conditions and with a similar product, is ±3.5 and ±7.0 cubic inches, for new and in-service devices, respectively. Here, the points of illegality are, for new devices, 64.9° F. and 54.9° F.; for in-service devices 69.9° F. and 49.9° F.

Utilizing a premium gasoline of 72° API under the same conditions, the $\overline{\Delta T}$ at which the dispenser becomes illegal is ±3.1° F. or 63.1° F. on the high side and is 56.9° F. on the low side, which differs from the $\overline{\Delta T}$ for illegality for regular gasoline.

Another object of this invention is to provide, in one form of the invention, an automatic accounting system which automatically records on magnetic tape: (a) the total gallons of product delivered, (b) the total number of individual sales, (c) the total revenue generated per day, week, month or year. At present, contemporary dispensers display this information through non-resettable digital counters which digitally represent the accumulated gallons and revenue generated in toto from the time of original dispenser installation or repair. This approach is subject to potential error in reading and transposition or in some cases to being overlooked entirely. In addition, contemporary dispensers merely reflect "totals", and it is impossible to reconstruct the cost benefit of maintaining any particular number of pumps in terms of individual sales. This factor becomes a necessary management tool in times of fuel crisis and with smaller gasoline tanks.

Another object of this invention is to provide a system and method as herein described which provides means for and embodies the capabilities of remotely interrogating and auditing the automatic accounting system as by means of a telephone coupler. Such auditing may be accomplished, either by the station operator or, more typically, by a firm or person in the business of supplying accounting services. The total information contained on a cassette at or for a given dispenser may be transmitted and recorded for auditing purposes via a telephone coupler, which may be initially interrogated by dialing a special telephone number, on a protected trunk, a precaution which prevents unauthorized or unintentional connection or commerical espionage. Authorized interrogation and coupling initiates cassette rewind and play, records the intelligence contained thereon, includes erasure if desired, and then rewinds for continued dispenser monitoring. The total revenue and gallons delivered accumulator provides the station operator with a physical check on the accuracy and fidelity of his accountant's output.

SUMMARY OF THE INVENTION

This invention pertains generally to the measurement of liquid petroleum products, and more specifically to the retail sale of gasoline. However, it is apparent that the device can be utilized to measure at any time or stage any liquid that has, as a part of its definition, a stipulated temperature and/or established specific gravity. Fluid milk and medically aseptic water, as well as drinking water, are classic examples of such need.

The present invention fills a long existing void, in providing a measuring device controlled by a solid-state electronic digital computer which assures delivery of constant energy, constant weight, and by definition, constant standard volume for any given petroleum product.

Table 8, D-1250, ASTM-IP Petroleum Measurement Tables, and Table 6A1.1 as contained in API Technical Data Book, Petroleum Refining, Volume 1, respectively, indicate the weight of 58° API gasoline per gallon as 6.216 pounds and of 72° API gravity as 5.788 pounds per gallon, irrespective of gasoline temperature. From the same publication, Volume II (See FIG. 14A1.1 "Heats of Combustion of Liquid Petroleum Fractions"), with the energy at 58° API indicated as 18,860 net BTU's per pound or 117,234 per gallon (18,860 × 6.216 = 117,234).

The system of this invention displays the total amount of gasoline, or other petroleum product, delivered in terms of U.S. Petroleum Gallons of 231 cubic inches at 60° F. The system also displays the total amount (cost) of the sale, based on the product of the above volume multiplied by a preset cost per gallon, as set on digital thumb wheel switches, and seen on a seven-bar digital display or other suitable display, such as an electromagnetic fluorescent disc display.

The system accommodates the API spectrum for petroleum products. It may be manufactured in a form fundamentally intended for retail use in consumer sales; however, the invention is expressly not limited to such usage. The system of this invention will accommodate the temperature spectrum within which gasoline is in a liquid state, within the limits of D-1250 for gasoline or 0° F. to 150° F. In the range 0° to 32° F. and below 0° F., as well as above 150° F., the system is augmented by artificial temperature control of the electronics.

All system controls and all calculations are performed in a special purpose digital microcomputer. The system accepts as its inputs: (1) the shaft angle rotation of a gasoline meter shaft; (2) the output of a sensor probe, indicative of the gasoline temperature at the point of delivery; (3) the output of a four-digit thumb wheel switch, indicative of the price per gallon; (4) the output of a two-digit thumb wheel switch, indicative of the API gravity of the gasoline being delivered; (5) the output of a four-digit thumb wheel switch, indicative of the volume per shaft revolution of the gasoline meter; and (6) an "end of sale" switch.

The positive angle shaft angle encoder utilized in this invention has neither of the mechanical deficiencies discussed above relative to the disc pulsers, such as the false pulsing due to mechanical vibration. The device of this invention, if vibrated in the same manner, alternately adds and then subtracts the smallest unit of the displayed values with a maximum change of one unit and a minimum change of zero.

The superiority of the positive angle shaft angle encoder over the pulser is a fundamental reason why this invention utilizes one in its preferred form.

The system generates four output values on digital displays: (1) U.S. Petroleum Gallons of 231 cubic inches at 60° F. (five digits); (2) the amount of sale in dollars and cents (five digits); (3) the price per gallon (four digits with a fixed decimal point between the dollar and cents decade); and (4) the temperature of the product being delivered (four digits on an integral display). It may, of course, be adapted to liters and other monetary systems.

At the start of each dispensing operation, the device automatically resets all totals and displays, except the accumulators and the price per unit measure display, if such reset has not previously been effected by the setting of an automatic time-delay reset. The automatic time-delay reset is adjustable to accommodate service stations of varying throughput (volume in gallons) and is overridable through initialization. Initialization consists of removal of the gasoline dispenser hose nozzle from its housed position, actuation of the dispenser pump on-off switch lever and insertion of the nozzle in the vehicle gasoline tank, then depressing or operating the delivery switch in the nozzle. In either case, by "time" or "initialization," all displays except the price per measure display are momentarily tested (e.g., in electronic displays reflecting all "eights", thereby checking each segment of each seven-bar display in an electromagnetic fluorescent disc display, display on all-black field); then they reset to zero, and upon nozzle switch actuation all gasoline dispensed will cause an increase in the display of U.S. Petroleum Gallons of 231 cubic inches at 60° F., and the display of the amount of sale in dollars and cents, until such time as the nozzle switch is deactivated.

Reinsertion of the gasoline dispenser hose nozzle back into its housed position locks out delivery capabilities unless and until the displays all reflect zero. Thus, when the gasoline dispenser is fitted with an automatic cut-off nozzle which is actuated by back pressure or liquid level, any "topping off" of the customer's gasoline tank may be accomplished prior to reinsertion of the nozzle to its housed position.

Once the nozzle is reinserted into its housed position, this action causes the microcomputer to recognize the end of the current sale, and initiates the reset timer. At the start of the next gasoline transfer (sale), the device will automatically reset all dynamic electronic (or electromagnetic fluorescent disc-type, or other) displays to zero; if this has not been effected automatically by the timer.

This invention accomplishes these heretofore practically and economically unaccomplishable functions by a dispenser-measurer which employs through a microcomputer preprogrammed to solve the following equation $$V_{60} = (1 + A'\overline{\Delta T} + B'\overline{\Delta^2 T})V_T$$

this equation being the formula developed by the National Bureau of Standards for correcting petroleum products of varying temperatures and densities to the National Bureau of Standards defined volume of a U.S. Petroleum Gallon of 231 cubic inches at 60° F.

By this invention the delivery of any given petroleum product, irrespective of its temperature or density, to the ultimate consumer is constantly and consistently subjected to the perpetual and precision volume correction of the above-cited National Bureau of Standards formula.

Even the small amounts of product contained within the dispenser hose, its meter, and its pump (if the pump is integral to the dispenser), — and the temperature of these small amounts of products almost invariably differs from that of the underground supply—is corrected to U.S. Petroleum Gallons of 231 cubic inches at 60° F. This resolution is accomplished by the placing and utilizing of a probe or sensor, preferably of platinum, strategically housed for protection and located for precision of measurement either within the gasoline dispenser nozzle or for the sake of protecting the probe, at the discharge side of the metering device. This probe or sensor is integral with a digital thermometer, the parallel BCD output of which reflects the temperature of the product flowing through or contained in the nozzle. Temperature is the only truly external variable which constantly affects the accuracy of product delivery, for API gravity changes only infrequently and may be corrected from supply to supply, when necessary, through a digital thumb wheel switch. The location of the temperature-sensing probe as close as possible to the point of transfer, i.e., in the discharge nozzle, or at the discharge side of the metering device, is an important factor in the accuracy of delivery of product to the ultimate consumer, and it forms a part of the preferred form of this invention.

BRIEF DESCRIPTION OF THE DRAWINGS

In the drawings:

FIG. 1 is a view in perspective of a gasoline dispensing unit embodying the principles of this invention.

FIG. 2 is an enlarged view in perspective of the microcomputer control unit of the gasoline dispensing unit of FIG. 1. The details of the display control panel of the microcomputer are shown.

FIG. 3 is a somewhat diagrammatic view in perspective of a gasoline dispensing unit like that of FIG. 1 in which the microcomputer has been removed and in which certain internal components are visible.

DETAILED DESCRIPTION OF A PREFERRED EMBODIMENT

Figure 4:
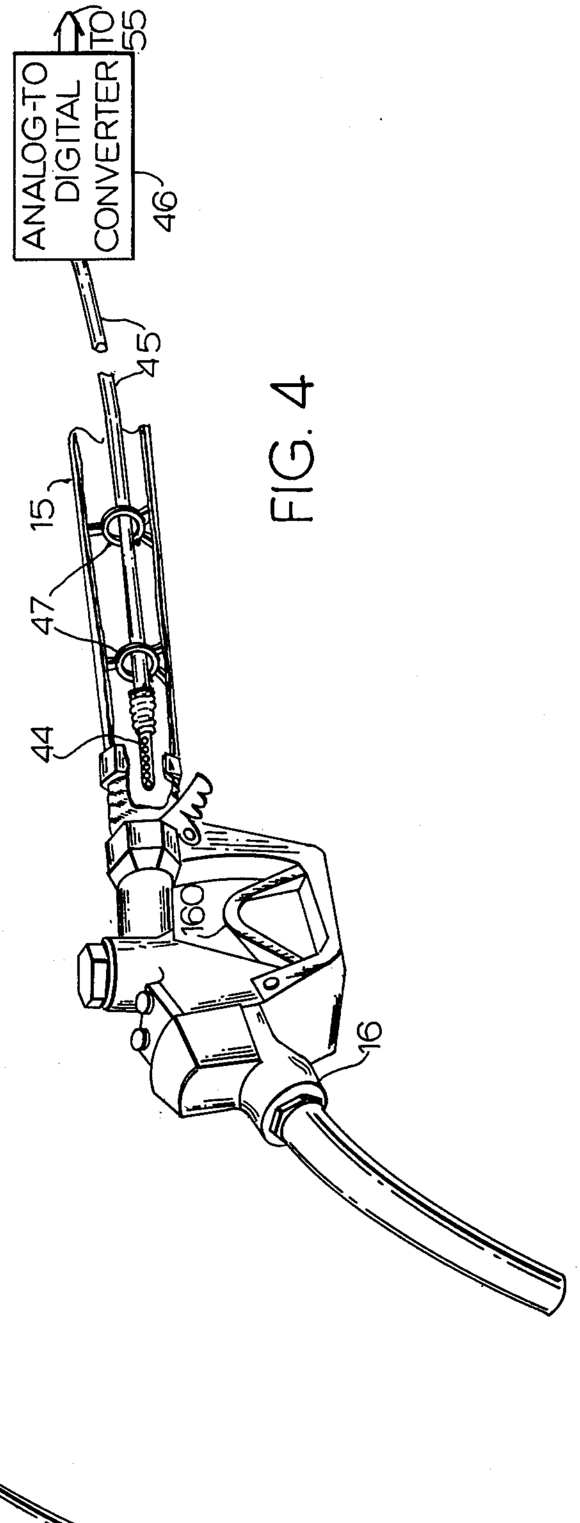
FIG. 4 is a view in perspective of the gasoline dispensing nozzle of the unit of FIG. 1 with a portion of the inlet fitting broken away to show the thermocouple. The thermocouple is shown connected to a diagrammatic representation of an analog-to-digital converter.

Gasoline dispensing unit:

A gasoline dispensing unit 10 is shown in FIGS. 1 and 3. The unit 10 comprises a housing 11, a display window 12, a nozzle receptacle 13, and an actuation handle 14. A hose 15 extends out from the housing 11 and is terminated at its outermost end at a dispensing nozzle 16 which rests in the receptacle 13 when not in use. An electronic digital microcomputer control unit 20 is installed in the dispensing unit 10, or it may be located totally remote from the dispenser if so desired. The digital displays and control knobs may be viewed through the window 12, or through a window supplied when the control unit 20 is to be remotely mounted. The top of the dispensing unit 10 is removable and a new top unit may be supplied to protect the shaft angle encoder 40 and house the nozzle and end-of-sale switches.

If the gasoline dispensing unit 10 has a contemporary mechanical computer, that computer is removed and discarded. This can be done easily after extracting three hexagonal-head cap screws. Then the mechanical computer can be lifted out. The mechanical articulating tee-joint connector which couples the output of the meter shaft to the input shaft of the mechanical computer, is a drop-in unit, employing a ball joint on each end fitted with a drive lock pin, the pins on each end being 90° displaced from each other. Each pin fits into a tee slot on the respective drive shafts of the meter and the mechanical computer. Thus, removal is relatively simple and feasible in the field, and retrofitting is very practical. Retrofitting in the field, is an extension of the removal cited above, plus, installation of the electronic computer which is accomplished as follows:

(1) installation of a mounting bracket for the shaft-angle encoder 40, followed by putting the encoder 40 and shaft couplings in place;

(2) installation of the electronic computer 20 package described below (hexagonal-head cap screws align with the holes previously utilized to secure the mechanical computer); and (3) installation of the platinum probe 44 described below, followed by interconnecting and calibrating.

Referring now to FIG. 2, the digital microcomputer 20 is housed in a suitable case 21 having a front display and control panel 22 containing thumb wheel switches, digital displays and other peripheral elements of the microcomputer 20. On the back panel (not shown) opposite the front panel 22, identical displays may be provided, so that the gasoline dispensing unit 10 provides visual indication of delivery information on both sides thereof as is traditional. This is true for either single or twin hose dispensers, as the microcomputer is utilized less than 50% of the time on a single hose dispenser.

Three separate digital output displays are provided by the microcomputer 20. (A fourth display 28*a* of price-per-unit is a direct function of an input thumb wheel switch 28.) First, a product temperature display 23 indicates the temperature (in degrees Fahrenheit or Celsius) of the gasoline at the nozzle 16. Second, a corrected volume display 24 indicates the number of U.S. Petroleum Gallons (or liters) corrected to a reference temperature of 60° F. Third, a cost of sale display 25 indicated in dollars (or other currency) the accumulated cost of the corrected amount of gasoline delivered at the dispensing nozzle 16.

Figure 12:
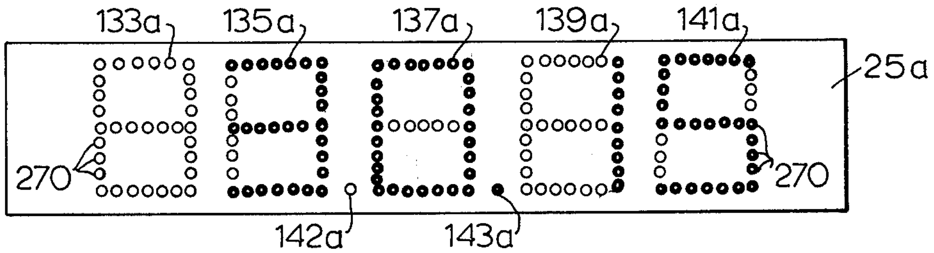
FIG. 12 is an enlarged view in front elevation of an electromagnetic reflective display module made up of a series of interconnected dot segments. This is an alternative to the display units in the microcomputer control panel, as shown in FIG. 2.

In addition, the control panel 22 includes an accumlative revenue counter 26 and an accumulative volume counter 27 for digital displays of total revenue and total gallons delivered. Provisions for a remote accumulative revenue counter 26*a* and a remote accumulative volume counter 27*a* are made so that revenue and volume totals may be read at a remote location. The accumulative counters 26, 26*a*, 27, and 27*a* may be of the well-known electromechanical type, whereas the digital displays 23, 24, and 25 may be assembled from seven-segment digit electronic display devices with, e.g., incandescent, fluorescent, or light-emitting diode (LED) segments. Alternatively, the digital displays 23, 24, and 25 may be assembled from electromagnetic fluorescent disc display devices, such as those manufactured by Ferranti-Packard Limited of Toronto, Canada. See, for example, U.S. Pat. Nos. 3,295,238, 3,283,427, 3,365,824, and 3,518,664. An alternative digital revenue display 25*a* assembled from such electromagnetic fluorescent disc units is illustrated in FIG. 12. Therein digital segments 133*a*, 135*a*, 137*a*, 139*a*, 141*a*, and decimal points 142*a* and 143*a* are assembled from plural series of electrically interconnected electromagnetic fluorescent disc display devices 270.

Figure 13:
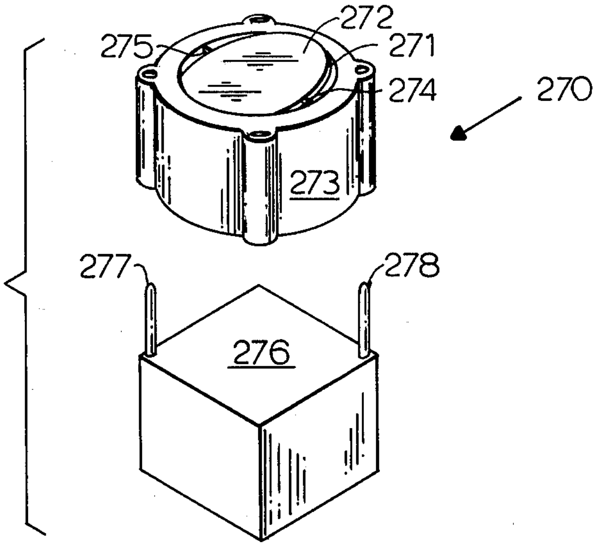
FIG. 13 is an exploded view in perspective of a single dot element of the numerical segments shown in FIG. 12.

As shown in FIG. 13, each disc display device 270 includes a pivotally mounted magnetized disc 271 which has on one side a fluorescent surface coating 272 and a non-reflective coating on the reverse side. The disc rotates within a housing of non-magnetic material 273 upon all but oppositely aligned pivots 274 and 275. The housing 273 nests with an electromagnetic solenoid unit 276 having opposite poles 277 and 278. In the nested position, with an electric current flowing in one direction through the solenoid unit 276, the magnetized disc 271 is attracted to a plane normal to the axes of the poles 277 and 278 thereby displaying the fluorescent coating 272. With the current flowing in the opposite direction, the field reverses between the poles 277 and 278, and the disc rotates 180°, thereby displaying the non-reflective surface.

In FIG. 13 the energized discs 270 are shown to display reflective surfaces indicating a cost of sale of $30.15. The balance of the discs 271 display the non-reflective side. It is to be understood that the display digit elements 133*a,* 135*a,* 137*a,* 139*a,* and 141*a* are wired and electrically biased to correspond functionally to the display elements 133, 135, 137, 139, and 141 which are illustrated and discussed in connection with FIG. 9D hereinafter.

The front panel 22 may also provide switch units for manual setting of various parameters. The unit price switch 28 includes four-digit thumb wheel switches and drives the price per unit display 28*a* comprised of four parallel seven-segment digit electronic or electromagnetic fluorscent disc display devices, which may be set to the price-per-corrected gallon. A volume revolution switch 29 includes four thumb wheel digit switches for setting the volume revolution ratio of the gasoline meter 38*a*. An API switch 30 includes two thumb wheel digit switches for manually setting the API gravity for the microcomputer 20.

The microcomputer 20 may, optionally, be provided with an incremental read/write cassette recorder 31 for on-line storage and playback of relevant data, such as revenue and volume data for each delivery which would equal the cumulative revenue displayed on the revenue counter 26 and the cumulative volume delivered accumulated on the volume counter 27, as well as other pertinent data. A model 133 incremental read/write cassette recorder made by the Memodyne Corp., Newton Upper Falls, Massachusetts, would be suitable in the present embodiment. With the inclusion of the recorder 31, the front panel 22 would be provided with a cassette well 32 for insertion of a standard tape cassette 33, and with, e.g., a record mode indicator 34 and a not-recording indicator 35. Accumulative data may thus be recorded on the cassette 33 and the cassettes periodically changed, thereby generally simplifying and automating the visual logging procedures of the prior art. Or, recorded information may be played back over a telephone line to a remote location in response to a selective recall signal from the remote point.

Referring now to FIG. 3, the display window 12 and the front part of the housing 11 are removed from the gasoline dispensing unit 10 to show electrical pump 38 and meter apparatus 38*a* connected between the hose 15 and a conduit 39 to the gasoline storage tank (not shown). Mechanically coupled to the meter 38*a* is a shaft-angle encoder 40, preferably digital. Of the several types available, including positive-contact or brush-operated shaft-angle encoders, we prefer optical encoders. A shaft-angle encoder 40, especially an optical one, provides a high resolution digital conversion of the shaft angle of the meter 38*a,* and thereby provides a direct analog-to-digital conversion of the volume of fluid material passing through the meter 38*a*.

A shaft-angle encoder 40 has considerable advantages over mechanical and even electronic pulsing systems, because of its low-torque operation, its inherent accuracy, and its continuity, all resulting in high resolution. It enables the establishment of a precise zero-point referent for each dispensing operation, constituting the exact angle at which a point on the shaft lies to a standard zero-angle point. Transmission is continuous rather than intermittant, and when it stops, the shaft angle to the original referent is precisely determined.

Figures 6, 7:
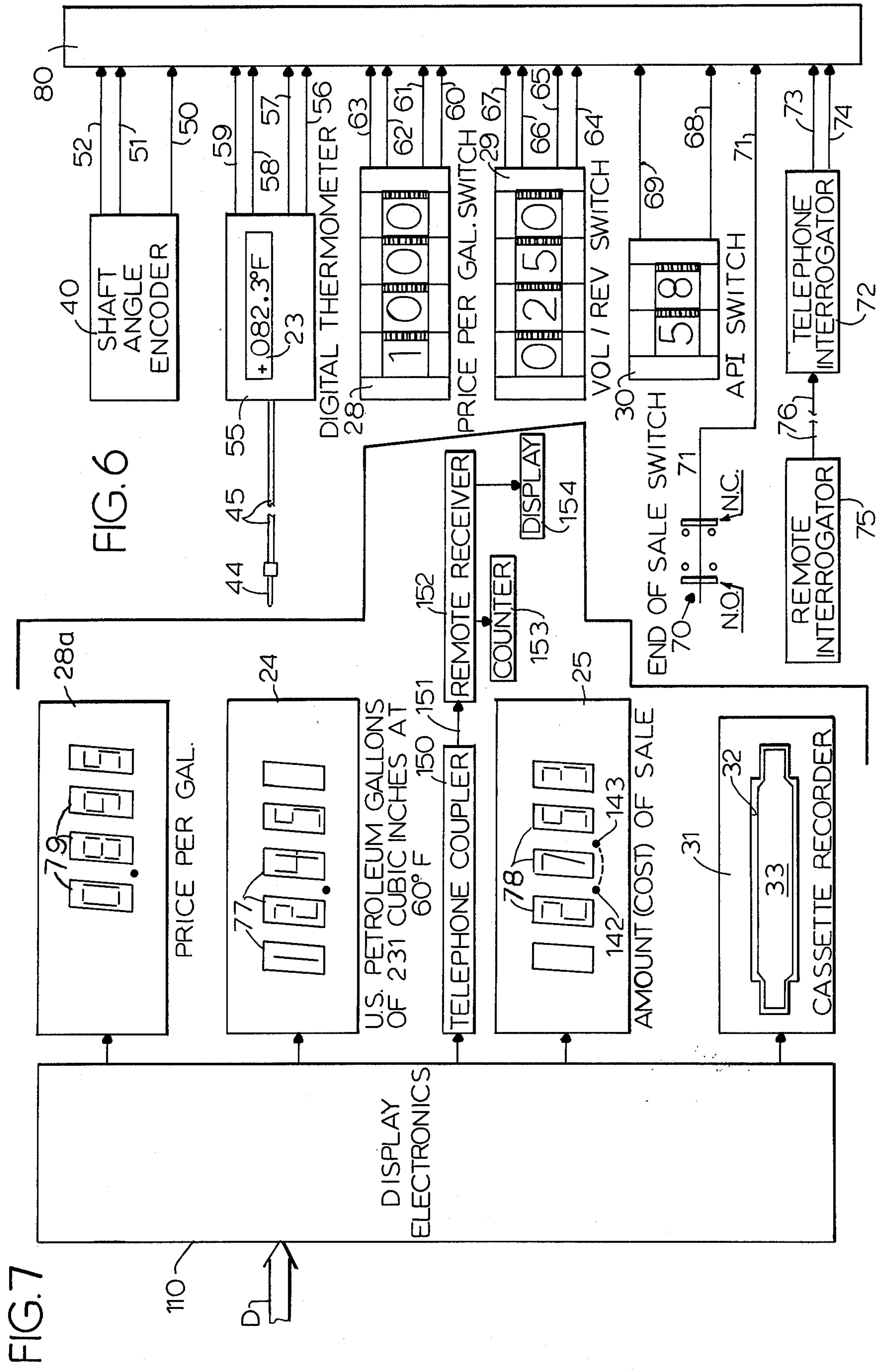
FIG. 6 is a generalized pictorial representation of the various input variables for a gasoline dispensing system embodying the principles of this invention.
FIG. 7 is a generalized pictorial representation of the various output displays for a gasoline dispensing system embodying the principles of this invention.

The optical shaft-angle encoder 40 may be of any well-known type, including the type employing a coded disc or drum 41, a light source 42, and a photoelectric detector cell 43. These components may be included in a single package, or they may be separate, as shown, somewhat diagrammatically in FIG. 3. An opti-coder, series 25H, manufactured by Sequential Information Systems, Inc. of Elmsford, New York, would be suitable for the optical shaft-angle encoder 40 of the present embodiment. As shown in FIG. 6, the shaft-angle encoder 40 is one of the digital inputs to the micromputer 20 and provides digitized volumetric data for calculations of sales price, etc.

As shown in FIG. 4, another data input source for the microcomputer 20 is the measurement of gasoline temperature at, or closely adjacent to, the dispensing nozzle 16. To provide the temperature data, a platinum thermocouple sensor 44 may be positioned in the hose 15 at a point where the hose 15 is joined to the nozzle 16. Such sensors 44 are obtainable on the market with a nearly perfect linear response at the temperature ranges encountered in the sale of gasoline. They do have a finite response time, usually in the vicinity of 250 milliseconds, so that the sensors can measure the actual temperature several times per second. If the response is nonlinear, the computer can correct for that. If sensors that respond more quickly become obtainable, they can be used to give even greater accuracy.

In the detailed view of FIG. 4, the sensor 44 and an electrical cable 45, which connects the sensor 44 to an analog-to-digital converter 46, are axially positioned by a series of spaced-apart star-shaped spacers 47 which enable the relatively unobstructed flow of gasoline, while maintaining the correct axially alignment of the sensor 44 and its cable 45. Thus several times each second (e.g., four times per second) a temperature signal can be transmitted by the sensor 44 via its cable 45.

Figure 5:
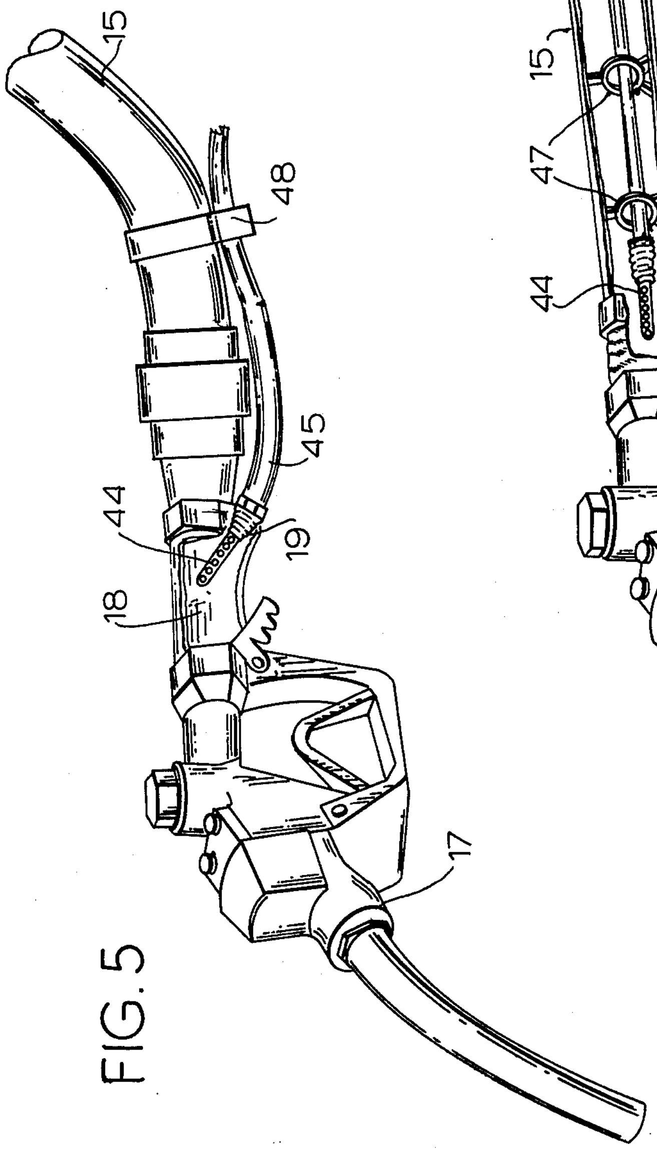
FIG. 5 is a view in perspective of a nozzle similar to that of FIG. 4 with a portion of the hose and the inlet fitting broken away to show the alternate placement of an internal thermocouple.

FIG. 5 illustrates a conversion of a current type of nozzle 17 to accommodate the thermocouple 44. A special coupling 18, fitted to receive the thermocouple through a port 19, may be placed between the nozzle 17 and the gasoline hose 15. In this case, the electrical cable 45 is external to the hose 15 and may be held against the hose 15 to prevent entanglement thereof by a series of spaced apart clamps 48 or by taping. And, as best shown in FIG. 3, the present invention lends itself to conversion of existing equipment simply by removing the conventional mechanical counter from the space 20*a* to be occuplied by the microcomputer 20 and by retrofitting the optical encoder 40 onto the shaft of the meter 38*a,* extending upwardly into the mechanical computer compartment. Of course, suitable modifications may be made to the housing 11 to accommodate insertion and support of the microcomputer 20 therein.

Figure 11:
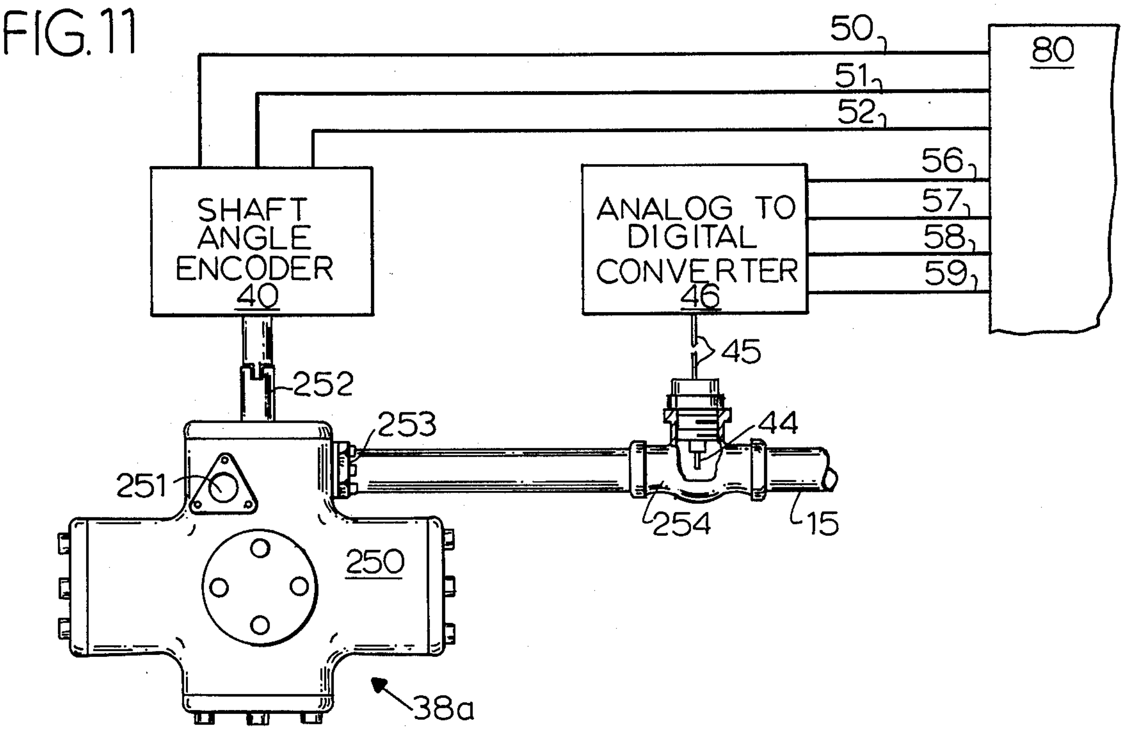
FIG. 11 is a fragmentary view in elevation of a gasoline meter with a temperature-sensitive probe installed on the discharge side thereof. This is an alternative to the installation of the probe in the nozzle, as shown in FIGS. 4 and 5.

FIG. 11 shows an alternative, to the embodiment shown in FIGS. 4 and 5. Here the platinum probe 44 is mounted on the discharge side of the meter 38*a*. This mounting in practice gives similar results to those obtained from mounting the probe 44 as shown in FIGS. 4 and 5, for the temperature gradient in the hose 15 is close to zero, e.g., the temperature is nominally constant at both ends of the fifteen-foot hose 15. However, in FIG. 11 the probe 44 is better protected. FIG. 11 shows the meter 38*a* with a housing 250, an inlet-port 251, a meter shaft 252, and an outlet discharge pipe 253. A fitting 254 is inserted between the port 253 and the hose 15, and the probe 44 inserted into the mainstream of the gasoline. The probe 44 is connected by the electrical signal cable 45 to the analog-to-digital converter 46 in the manner and for the purposes discussed herein in connection with FIGS. 4 and 5.

THE INPUT DEVICES

(FIG. 6)

As shown somewhat diagrammatically in FIG. 6, seven-digital data input devices supply data to an input subsystem 80 of the microcomputer 20 of the present invention: First, the digital shaft-angle encoder 40 coupled to the gasoline meter apparatus 38*a*, as previously explained, provides a digital input of volumetric data via leads 50, 51, and 52. Second, the electrical cable 45 from the platinum thermocouple sensor 44 at the nozzle 16 (or 17) provides an input to a digital thermometer 55, which converts the analog electrical signal from the sensor 44 into a digital format compatible for input via leads 56, 57, 58, and 59. The digital thermometer 55 may also provide the digital display 23 of gasoline temperature. The digital thermometer 55 may be of any well-known type, such as the model 1065 digital platinum thermometer made by Relco Products, Inc., Denver, Colorado. As previously explained, three of the digital inputs may be provided by three sets of thumb wheel switches--third, the price-per-gallon switch 28 (via leads 60, 61, 62, and 63), fourth, the volume revolution switch 29 (via leads 64, 65, 66, and 67), and fifth, the API set switch 30 (via leads 68 and 69). These digital thumb wheel switches 28, 29, and 30 may be of a type well known in the art, such as those manufactured by Interswitch, 770 Airport Boulevard, Burlingame, California. Sixth, a sixth digital input is provided by an end-of-sale switch 70, which may be mechanically linked to the actuation handle 14 and electrically connected to the computer 20 via a lead 71. Seventh, the last input device is an optional telephone decoder interrogator circuit 72 for remote input capability, which is connected to the input subsystem 80 via leads 73 and 74. The telephone circuit 72 serves to couple a remotely located interrogator 75 to the input subsystem 80 via a telephone line 76. The interrogator 75 provides a remote control capability for such purposes as selective recall and transmission of data stored in the computer 20 or of information recorded on a cassette 33.

The output devices

(FIG. 7)

As explained in connection with the description of the front panel 22 of the microcomputer 20, in FIG. 2, the computer 20 provides two outputs suitable for visual display by digital display segments, the digitally corrected volume display 24 and the cost-of-sale display 25. These two displays are shown somewhat diagrammatically in FIG. 7. And, as previously discussed, these displays may be comprised of a series of two seven-segment display digits 77 and 78, or of a series of electromagnetically actuated fluorescent disc-type displays, each being driven by a suitable display drive element in an output subsystem 110 described hereinafter in connection with FIG. 9D. The drive elements in the output subsystem 110 receive binary commands from a data bus D within the microcomputer 20 and convert the information into digital format for display on the seven segment digits 77 and 78.

An unmistakable constant visual display of the price per gallon (or other measure unit) is provided by the display 28*a* which provides four seven segment display digits 79 parallel across the manually operated thumb wheel price per gallon switch 28. The display electronics for driving the price-per-gallon display 28 is essentially the same as the drive elements utilized in the output subsystem 110 described hereinafter. However, the data providing the drive signal to the display 28*a* is taken directly from the setting of the switch 28.

As previously mentioned, the microcomputer 20 may be provided with a digital cassette recorder 31 suitable for recording output data received from the data bus onto a cassette 33. The recorder is controlled by the output subsystem 110. Transmission of data recorded on the cassette 33 and data in the computer 20 may be initiated by the remote interrogator 75 and sent via the telephone line coupler 150 and a telephone line 151 to a receiver 152 at the remote end where the data may be further accumulated in a counter 153 or displayed by a display unit 154. The counter 153 would function to provide centralized control of inventory and resupply and could receive data from many different dispensing units 10 at different locations.

MICROCOMPUTER ARCHITECTURE

Figure 8:
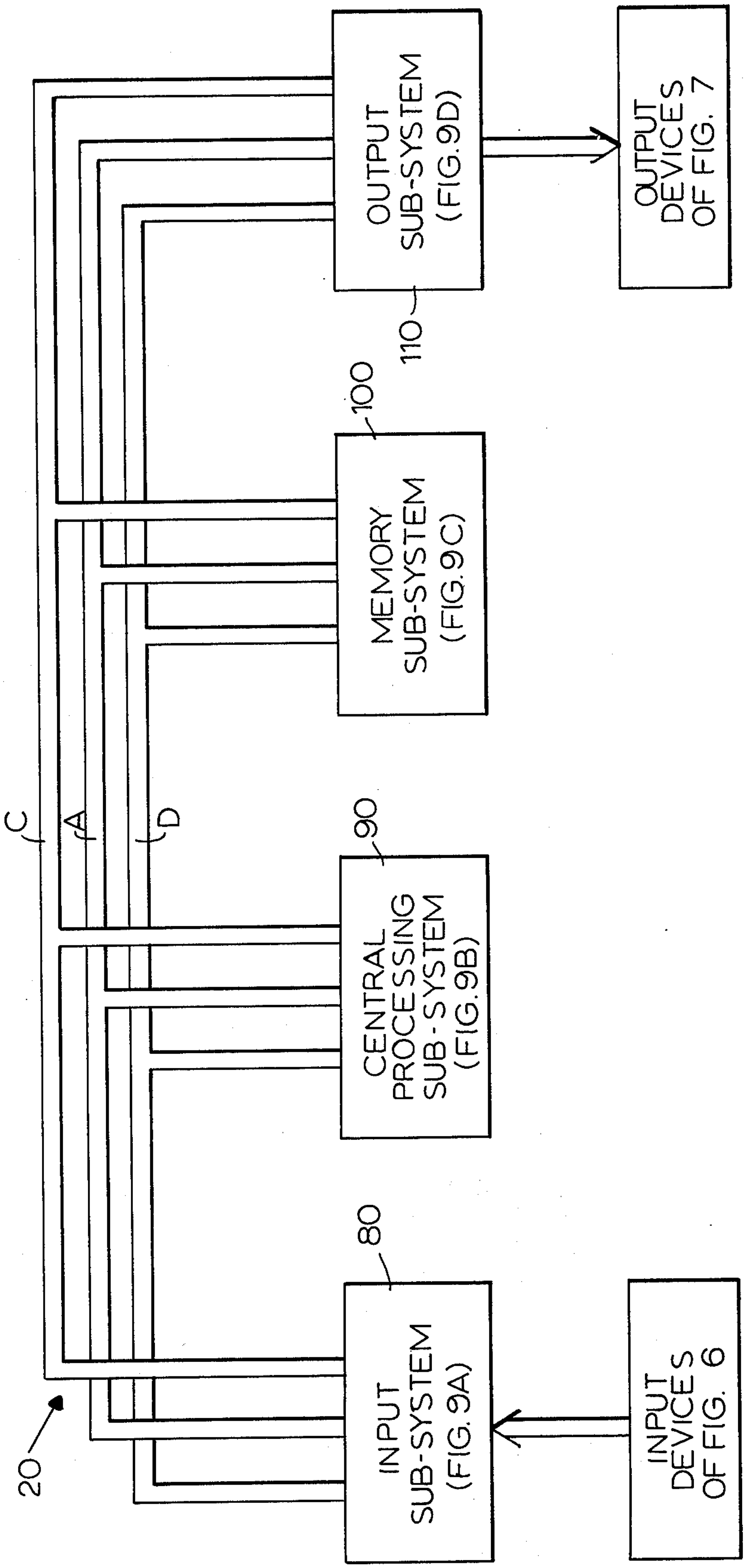
FIG. 8 is a summarized block diagram of a microcomputer for the system of this invention.

Overall system (FIG. 8)

The system layout of the microcomputer 20 of the present invention is summarized by the block diagram of FIG. 8. It is shown in detail by the four sheet block diagram of FIG. 9 with each sheet devoted to a subsystem: the input subsystem 80 in FIG. 9A receiving inputs from the elements described in connection with FIG. 6; a central processing subsystem 90 of FIG. 9B; a memory subsystem 100 of FIG. 9C; and the output subsystem 110 of FIG. 9D which drives the output devices described in connection with FIG. 7. As shown in FIG. 8, there are three separate signal paths which extend throughout the entire microcomputer system 20. These paths on busses are: (1) an eighteen-bit control and status bus C, (2) a sixteen-parallel-bit address bus A, and (3) a bidirectional eight-parallel-bit data bus D. These busses are shown as paths C, A, and D in FIGS. 8 and 9A–D.

THE INPUT SUBSYSTEM 80

(FIG. 9A)

Figure 9A:
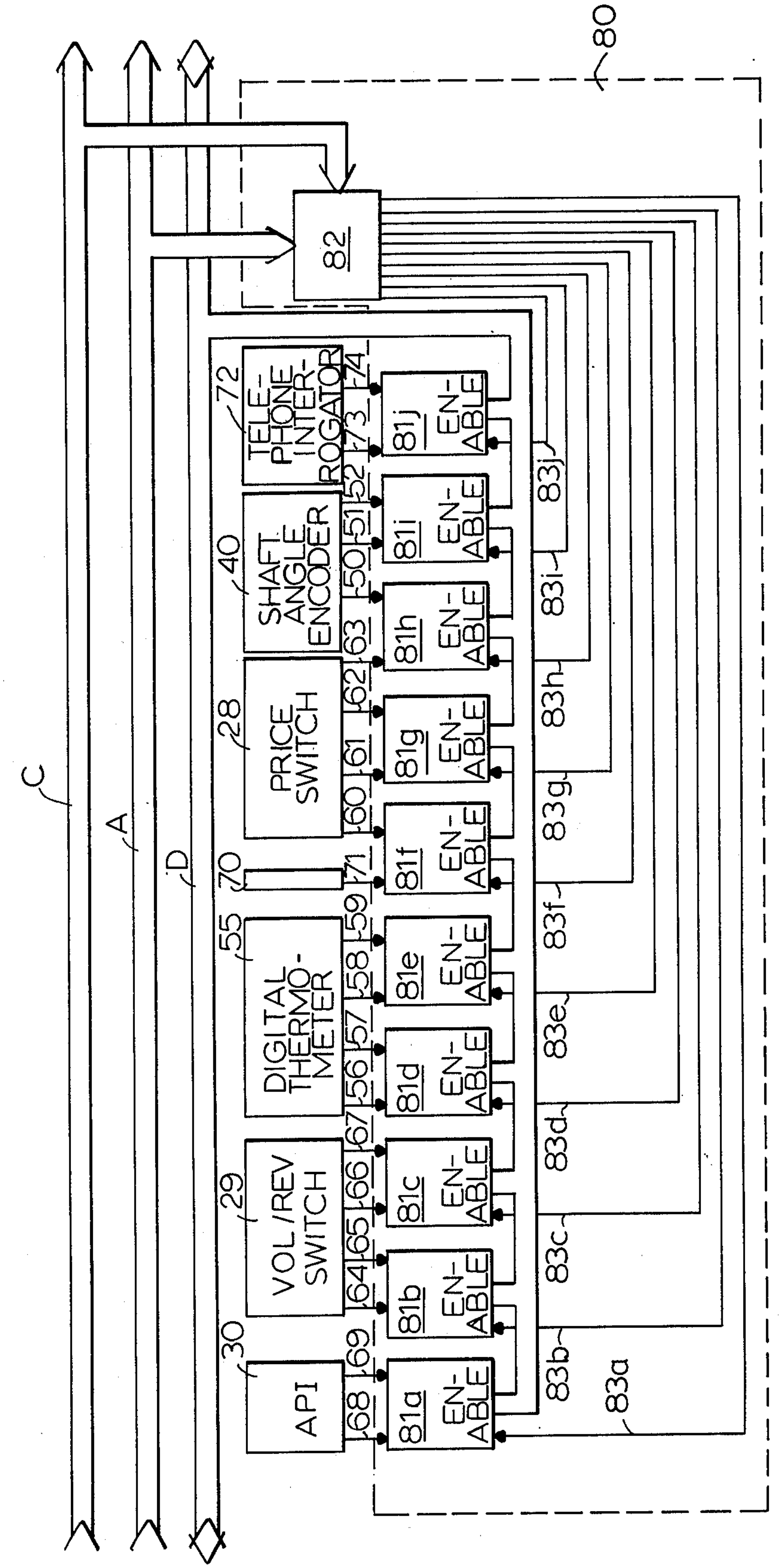
FIG. 9A is a detailed block diagram of the input unit for the microcomputer of FIG. 8.

The input subsystem 80 is detailed in FIG. 9A. Data from the input devices including the shaft-angle optical encoder 40, the digital thermometer 55, the price switch 28, the volume switch 29, the API set switch 30, the end of sale switch 70, and an optional telephone dialer interrogator 72 is received into the microcomputer 20 through ten gated eight-bit bus drivers 81*a*, 81*b*, 81*c*, 81*d*, 81*e*, 81*f*, 81*g*, 81*h*, 81*i*, and 81*j*, providing suitable driving levels and impedance matching to the common bidirectional data bus D. Input device address signals are received from the address bus A by an input device decoder 82 which selectively enables a preselected driver during an input phase of a machine cycle by virtue of gate connections 83*a*, 83*b*, 83*c*, 83*d*, 83*e*, 83*f*, 83*g*, 83*h*, 83*i*, and 83*j* running to each driver 81*a* through 81*j*, respectively. Control signals in the control and status bus C govern the operation of the decoder 82 in accordance with programmed functional sequence of the microcomputer 20.

During operation, as shown in the program beginning at page 53 below, the input commands are sent from the microcomputer 20 to one selected set of bus drivers 81 via one of the control line connections 83. Thus, for example, to obtain data from the API set switch 30, the command is sent to the driver 31*a* via the line 83*a*, and the API set switch data is then passed onto the data line D. Similarly, data is obtained upon command from the Volume per Revolution switch 29, the digital thermometer 55, the end of sale switch 70, the price switch 28, the shaft-angle encoder 40, and the telephone interrogator 72, the command being sent to the particular driver 81, via a line 83 and the data transmitted from the selected input device through the data bus D to the central processing unit of the microcomputer 20. Consequently, each input device continuously generates or provides data, and it is transmitted to the computer 20 upon a command sent from the computer 20 to the input device circuitry.

THE CENTRAL PROCESSOR 90

(FIG. 9B)

Figure 9B:
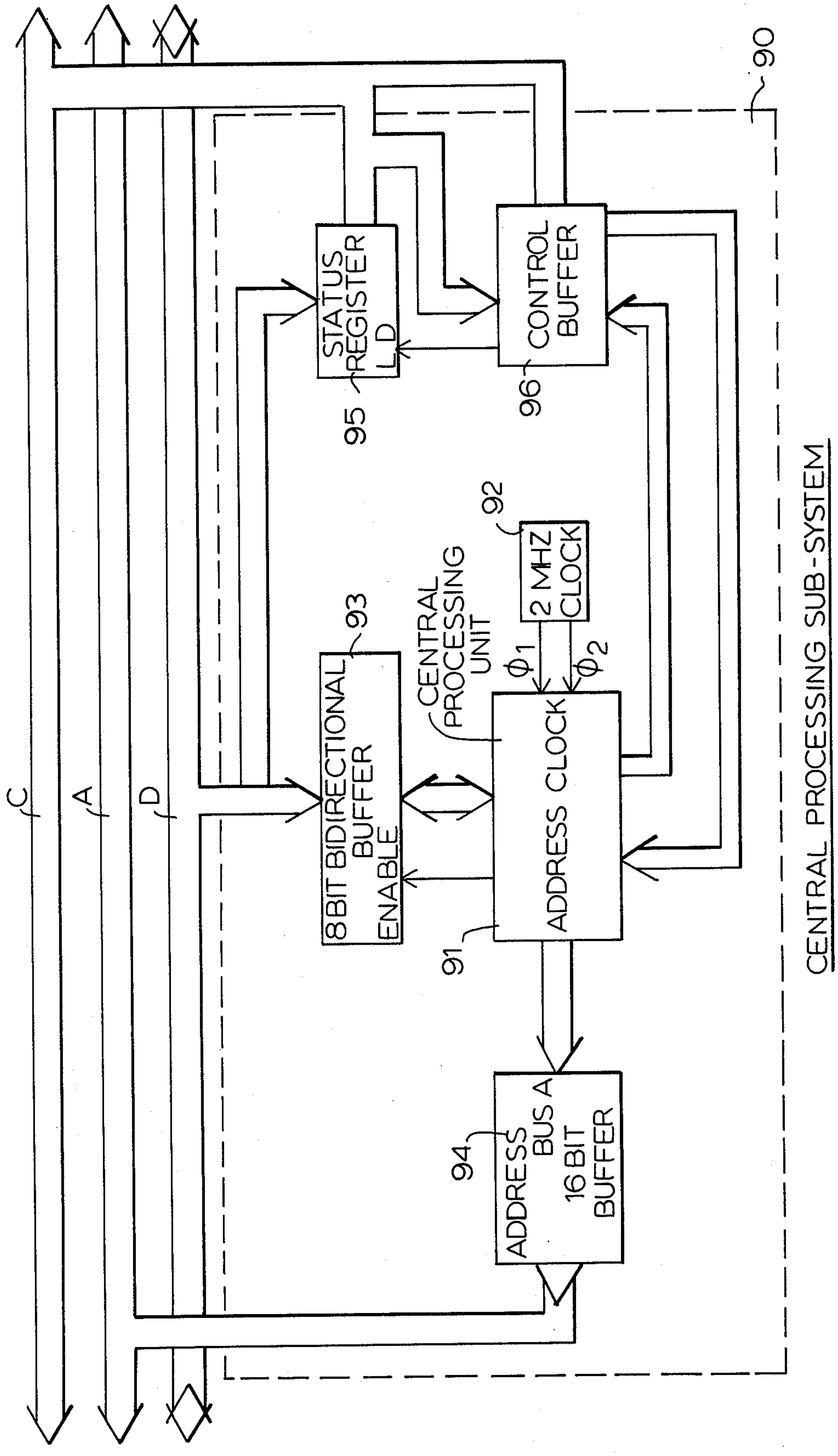
FIG. 9B is a detailed block diagram of the central processing unit of the same microcomputer.

The control, address and data busses C, A, and D communicate with all subsystems of the microcomputer 20; they originate at the central processing subsystem 90, which is disclosed in the block diagram of FIG. 9B. At the heart of the central processor 90 is a single-chip eight-bit MOS integrated circuit central processing unit 91, such as Type 8080 made by Intel Corporation, Santa Clara, California. This processing unit 91 combines control and arithmetic logic unit functions into a single monolithic semiconductor. External elements such as a clock 92 outputting two series of timing pulses $\phi 1$ and $\phi 2$ at 2 megahertz, an eight-bit bidirectional buffer 93 for the data bus D, and a sixteen-bit buffer 94 for the address bus A are connected at input/output ports of the unit 91. A status register 95 parallels the data bus D to develop control input signals dependent upon the state of the data bus D. These control signals interface between the control and status bus C, and a control buffer 96, which itself interfaces with the control portion of the unit 91.

THE MEMORY SUBSYSTEM 100

(FIG. 9C)

Figure 9C:
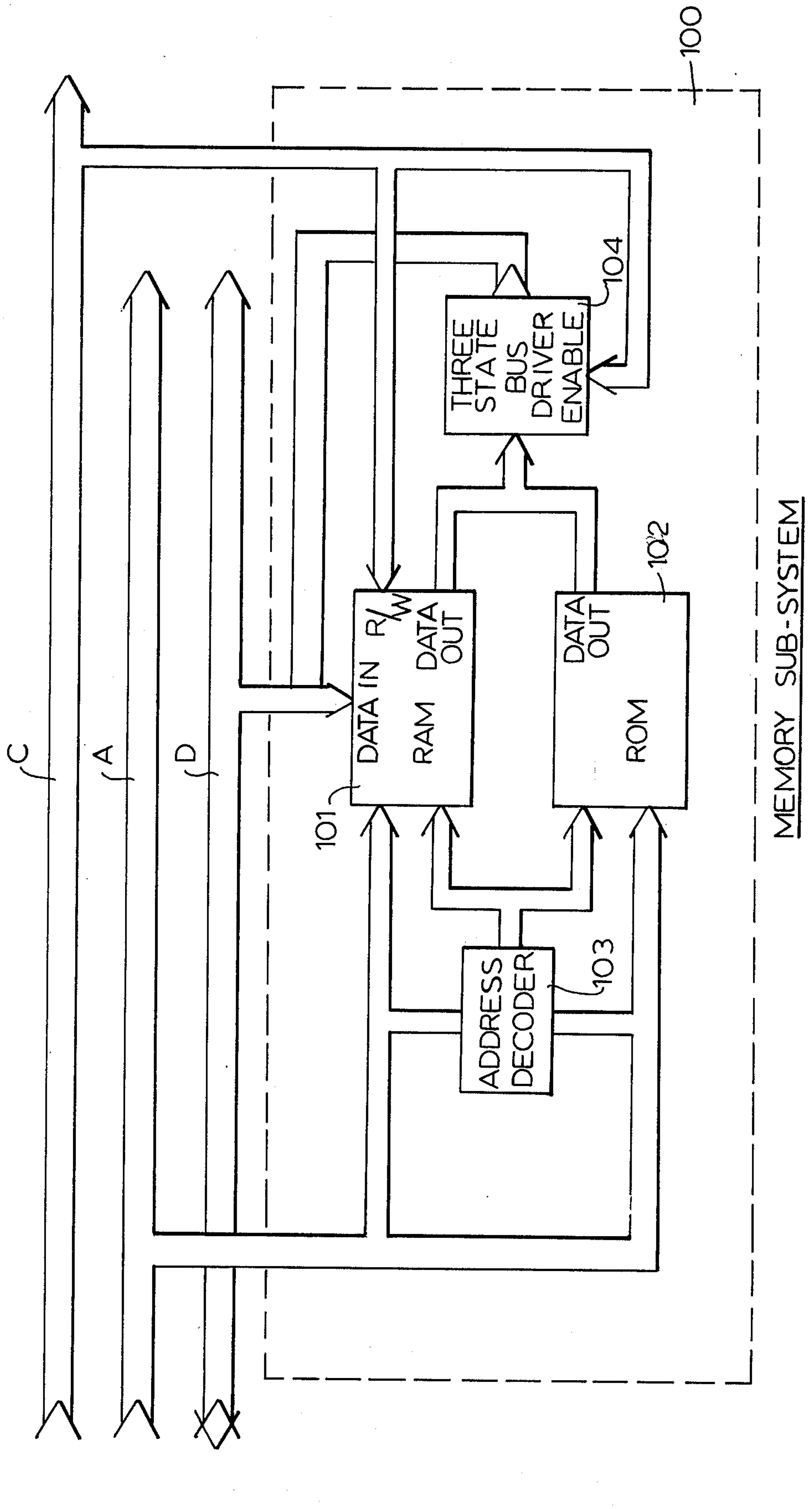
FIG. 9C is a detailed block diagram of the Control Program and Data Storage Memory unit of the same microcomputer.

Turning our attention to the memory subsystem 100 described in FIG. 9C, it can be seen that there are two different types of memory units, random-access memory (RAM) 101 and read-only memory (ROM) 102. In the particular application of the present invention the RAM 101 must have a storage matrix in the range of 256 × 8 bits, and the ROM 102 should have a preprogrammed capacity on the order of 2048 × 8 bits. The RAM 101 provides temporary storage for sensed data from the input devices and for calculation intermediates and results, while the ROM 102 contains the control program and certain data tables and constants needed during program execution. In the embodiment shown in FIG. 9C, the RAM 101 includes two monolithic memory chips such as Signetics Type 2606 wired to provide the required bit matrix of 256 × 8. The ROM 102 includes eight monolithic memory chips such as Intel Type C 1702 A wired to provide a read only matrix of 2048 × 8 bits. Because multiple memory chips are used in the RAM 101 and the ROM 102, and both are addressed by a common address bus C, an address decoder 103 is included to enable selection of each monolithic chip at the appropriate time. The output of program and data from the RAM 101 and ROM 102 is buffered in a three-state gated parallel bus driver element 104, which is itself controlled by signals from the control and status bus C. It is to be understood that the ROM 102 is preprogrammed with the control program and data tables, or it may be of the field programmable PROM variety.

THE OUTPUT SYSTEM 110

(FIG. 9D)

Figure 9D:
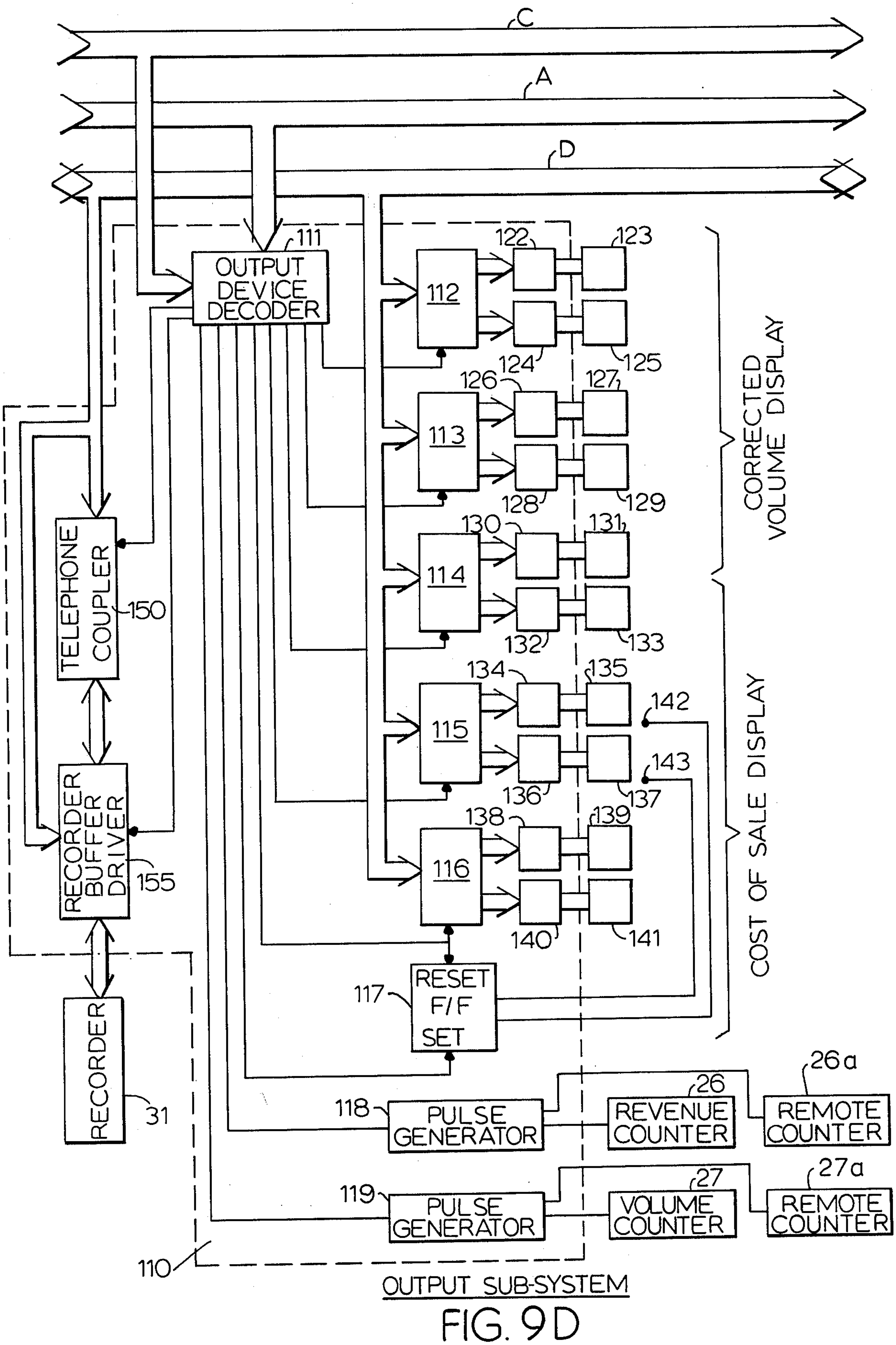
FIG. 9D is a detailed block diagram of the output unit of the same microcomputer.

The output subsystem 110 is illustrated by the block diagram of FIG. 9D; it includes an output device decoder 111 which is enabled by signals from the control and status bus C to decode address bus A information and drive output registers 112, 113, 114, 115, and 116, a decimal point flip flop 117, and two pulse generators 118 and 119.

The output register 112 is connected through a decoder-driver 122 to a seven-segment one-digit display 123 and through another driver 124 to a second display 125. The register 113 is connected through decoders 126 and 128 to digit displays 127 and 129, respectively. The register 114 is connected through a driver 130 to a display 131. The five one-digit displays 123, 125, 127, 129, and 131 are adjacently collocated to provide the corrected volume display 24 as shown in FIG. 2. To minimize consumer confusion, the lead decade zero (far left) is suppressed when the display is below $10.000, e.g., $9.999. When the displayed cost is at maximum, it reads $999.99; thus, we include zero suppression and a floating decimal point.

The register 114 is also connected through a driver 132 to a digit display 133; the register 115 is connected through drivers 134 and 136 to displays 135 ad 137, respectively; and register 116 is connected through drivers 138 and 140 to displays 139 and 141, respectively. The five one-digit displays 133, 135, 137, 139, and 141 are adjacently collocated and provide the cost-of-sale display 25.

The decimal point flip flop 117 selectively drives two decimal points 142 and 143 which are positioned on each side of the middle digit 137 of the cost-of-sale display 25. Thus, a decimal indication may be on the right or left of the middle digit 137, as best illustrated in FIG. 2.

The pulse generator 118 is wired to drive the accumulative revenue counter 26, and the generator 119 similarly drives the accumulative volume counter 27. The remote accumulators 26*a* and 27*a* may be placed at a site such as within the service station office for ease and efficiency in reading.

Data from the data bus D may also be provided to a telephone coupler 150 for transmission via the telephone system to a remote location. If this feature is included (it is optional), it would function in conjunction with the telephone dialer interrogator 72, previously described in connection with the input subsystem 80.

Data may also be provided from the data bus D to the incremental read/write cassette recorder 31 through a recorder buffer driver 155. The driver 155 may also include a bidirectional data path from the telephone coupler 150 so that data may be transmitted and received at the recorder 31 from a remote location via the telephone system as coupled through the coupler 150 and the interrogator 72.

OPERATION

(FIG. 10)

Figure 10:
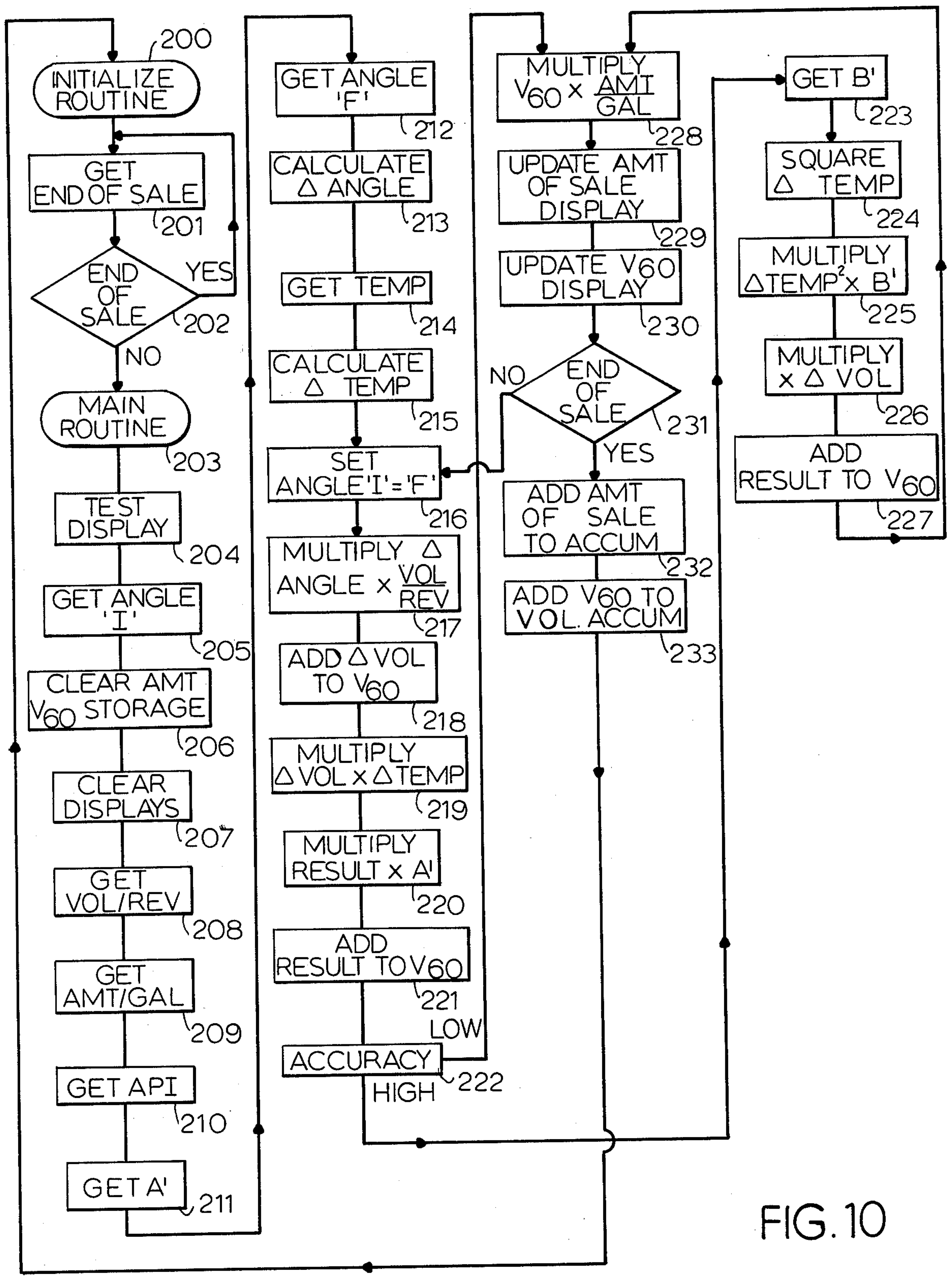
FIG. 10 is a detailed flow chart of a control program for the microcomputer of FIGS. 8 and 9.

With the foregoing description of the preferred embodiment of the present invention in mind, and referring to the program flow chart set forth in FIG. 10, one delivery cycle of automatic operation of the gasoline dispensing unit 10 of the present invention shall now be described.

To initiate operation of the unit 10, an operator rotates the actuation handle 14 to the "on" position. The electric pump 38 is thereupon energized in the conventional manner, and the "end of sale" switch 70 which may be linked to the actuation handle 14 or which may be positioned within the nozzle receptacle 13, provides a digital input signal on line 71 to the inputs of system 80 of the microcomputer 20. This signal starts an initialized routine 200 which includes clearing of certain registers and other data locations in the central processing unit 91, while establishing that "no sale" is in progress by getting an "end of sale" switch "no" signal at steps 201 and 202. If a sale is in progress, the program repeatedly loops through decision 202 to get an "end of sale" signal at step 201 until such time as a "no" signal is received. Thereupon the computer sequences to step 203.

When the computer commences the main routine at step 203 it first provides a test display at step 204 to assure that each segment of each seven-bar display (or each unit of some other suitable type of display, such as the electromagnetic fluorescent disc type) is operable. All dynamic displays will indicate the seven-bar digit "eight" on the test display made of step 204.

The computer then reads the initial angle (ANG I) at step 205. With respect to the initial angle (ANG I) 205 and the final angle (ANG F) 212, the optical encoder 40 provides a digital output signal, e.g., up to 3600 per revolution, corresponding to its relative angular position at any time. Thus, its initial angles at the moment it is read by the computer during one program cycle might be, e.g., 264. When the computer later reads the final angle during the same program cycle, the encoder may have revolved in accordance with the flow so that its final angle signal might be, e.g., 762. An internal comparison step 213 compares the initial angle ascertained in step 205 with the final angle ascertained in step 212. The final angle will always be greater than the initial angle, although it may appear numerically inferior due to multirevolution and a numerically inferior stopping point, which may be the case when the shaft-angle optical encoder 40 is rotating incident to the delivery of gasoline.

The computer is next programmed to set-up loop counter clear accumulator and clear overflow byte then clear amount of $V_{60}$ storage at step 206 and to clear all dynamic displays at step 207.

The volume per revolution data is received into the microcomputer at step 208 through a preestablished manual setting. This information is set into the digital thumb switch 29. In the next step 209, the computer obtains the price-per-corrected gallon amount from the thumb wheel switch 28. In the next step 210, the computer obtains the API gravity data for the particular gasoline which has been set in the thumb wheel switch 30.

The computer initializes the register for the amount, the register for the volume at the actual temperature and the register for the volume at the corrected temperature of 60° F., respectively.

In step 211, the computer retrieves the appropriate constant valve for A' from a table in the read-only memory 102, and multiples the intermediate arithmetic program resultant in step 220, by the A' constant.

In step 212, the computer once again obtains the real time final angle and calculates the total angle of the optical encoder 40. In step 213, the computer calculates the differential angle, being the difference between the final angle and the initial angle. In step 214, the computer obtains several times per second (e.g., each quarter-second) the actual delivery temperature from the digital thermometer 55. In step 215, the computer calculates several times per second the differential temperature, which is the difference between the actual temperature obtained in step 214 and the reference temperature, which is programmed in this case to be 60° F. In step 216, the computer sets the initial angle to the same value as the final angle. In step 217, the computer multiplies the differential angle which it determined in step 213 by the volume-per-revolution ratio it determined in step 208.

In step 218, the standard Δ volume at 60° F. determined in 217 is incremented to an accumulated volume at standard temperature ($V_{60}$).

In step 219, the sum developed in step 218 is multiplied by the differential volume figure calculated in 217 to provide the differential volume at standard temperature.

In step 220, the A' function retrieved in 211 is now commanded to multiply the sum developed in 219 by A'.

In step 221, the sum developed in 220 is added to ($V_{60}$) which reflects differential volume at standard temperature incremented to an accumulated volume at standard temperature ($V_{60}$).

The computer may be provided with either or both of two calculation routines, a high accuracy routine and a low accuracy routine, depending upon its intended application. Thus, at step 222, the computer being so programmed will follow the high accuracy routine or the low accuracy routine. This decision, while normally made during manufacture, may be changed in the field.

In the high accuracy routine, the first step 223 is to retrieve an appropriate constant value B' from read-only memory storage 102. In step 224, the computer squares the differential temperature calculated at step 215. Then, in step 225, the square of the temperature determined in the step 224 is multiplied by the B' constant retrieved in the step 223. Next, in step 226, the product obtained at step 225 is multiplied by the differential volume determined in the step 217. In step 227, the product of step 226 is added to the ($V_{60}$) sum established in 221.

Preferably, the computer is programmed for a high accuracy calculation routine at step 222, and all of the steps 223, 224, 225, 226, and 227 are included. If, for any reason, a low accuracy program would be desired, then those steps 223, 224, 225, 226, and 227 are eliminated, and the computer proceeds from step 222 to step 228 directly. The remainder of the program, whether high and low accuracy, is identical from 229 on.

In step 228, the $(V_{60})$ developed at 221 will differ by the small amount developed at 227; thus, the product of 228 will vary slightly as a result of the choice of high or low accuracy programming. The high accuracy program will track with all established petroleum measurement tables and, in particular, with those established by the National Bureau of Standards. In step 228, the cost of sale is established by multiplying the actual $V_{60}$ gallons delivered by the established unit cost set in thumb wheel switch 28, for $V_{60}$ gallons.

In step 229, the volume figured at the standard temperature and calculated at step 221 (low accuracy) or step 227 (high accuracy) and then multiplied in step 228 by the amount per gallon information obtained at step 209, is then output on the data bus D and supplied to the outputs of subsystem 110 for display update of the amount-of-sale display 25 in step 229.

At the same time, for step 230, the volume $(V_{60})$ is output on the data bus D from the central processing subsystem 90 to the output subsystem 110 wherein the corrected volume display 24 is updated in step 230.

In step 231 of the program routine, the computer determines whether the delivery of petroleum has ended by scanning the "end of sale" switch 70. If the sale has not ended, the computer returns to step 216 to commence the portion of the program following after that step. If the "end of sale" switch informs the computer that the particular delivery is completed, the computer advances to step 232, where the revenue generated by the just consummated sale is added to the total revenue accumulator 26 and, at the conclusion of this update, the computer advances to the last operation, step 233, where the total gallons of $(V_{60})$ volume is added to the total gallons accumulator 27. The computer then returns to the initialize routine step 200 and awaits the next delivery. It is to be understood that, as the clock 92 operates at two megahertz, the foregoing program cycle is accomplished in a fraction of a second and may be repeated hundreds and thousands of times during a given delivery.

THE MICROCOMPUTER PROGRAM

The following constitutes a program in assembly language for the microcomputer 20 of the present invention. The program also includes a decimal multiplying table, an A' constant table, and a B' constant table, as well as address sssignments for the random access memory 101. It is to be understood that the program would be placed into the read-only memory 102 either incident to the fabrication of the memory, or incident to field programming if a programmable read-only memory (PROM) is utilized in the microcomputer 20.

```
ADDRESS    BINARY
           000 000      * 000000
00 000 303 045 000        JMP MAIN        /GO TO START OF PROGRAM
00 003 000                NOP
00 004 000                NOP
00 005 000                NOP
00 006 000                NOP
00 007 000                NOP
00 010 063                INX SP
00 011 063                INX SP
00 012 301                POPX BC
00 013 305                PSHX BC
00 014 303 275 003        JMP ADB
00 017 000                NOP
00 020 063                INX SP
00 021 063                INX SP
00 022 301                POPX BC
00 023 305                PSHX BC
00 024 303 330 003        JMP ADT
00 027 000                NOP
00 030 303 214 003        JMP PROD        /GO TO PRODUCT SUBROUTINE
00 033 000                NOP
00 034 000                NOP
00 035 000                NOP
00 036 000                NOP
00 037 000                NOP
00 040 007                RLC      /THIS SUBROUTINE SWAPS
00 041 007                RLC      /THE TOP AND BOTTOM
00 042 007                RLC      /DIGITS IN THE ACCUMULATOR
00 043 007                RLC
00 044 311                RET
00 045 061 377 075 MAIN,LXI SP 036777 /POINT SP TO TOP OF RAM
00 050 041 000 075        LXI HL AI       /SET UP MEMORY ADDRESS
00 053 333 030            INP 030 /GET AI D1,D0
00 055 167                LM A     /STORE IN MEMORY
00 056 043                INX HL   /INCREMENT MEMORY ADDRESS
00 057 333 027            INP 027 /GET AI D2
00 061 346 017            NDI 017 /MASK OUT EOS SWITCH
00 063 167                LM A     /STORE IN MEMORY
00 064 043                INX HL   /INCREMENT MEMORY ADDRESS
00 065 006 010            LBI 010 /SET UP LOOP COUNTER
00 067 257                XR A     /CLEAR ACCUMULATOR
00 070 062 043 075        STA OVFL        /CLEAR OVERFLOW BYTE
```

```
00 073 167          P1,   LM A     /CLEAR MEMORY AMOUNT, V60
00 074 043                INX HL   /INCREMENT MEMORY ADDRESS
00 075 005                DCB      /BUMP LOOP COUNTER
00 076 302 073 000        JFZ P1   /NOT DONE YET
00 101 323 020            OUT 020  /CLEAR DISPLAYS
00 103 323 021            OUT 021
00 105 323 022            OUT 022
00 107 323 023            OUT 023
00 111 323 024            OUT 024
00 113 323 025            OUT 025
00 115 333 023            INP 023  /GET GAL PER REVOLUTION D1,D0
00 117 167                LM A     /STORE IN MEMORY
00 120 043                INX HL
00 121 333 022            INP 022  /GET GAL PER REVOLUTION D3,D2
00 123 167                LM A
00 124 043                INX HL
00 125 333 021            INP 021  /GET AMOUNT PER GALLON D1,D0
00 127 167                LM A
00 130 043                INX HL
00 131 333 020            INP 020  /GET AMOUNT PER GALLON D3,D2
00 133 167                LM A
00 134 043                INX HL
00 135 333 024            INP 024  /GET API
00 137 247                ND A     /SET FLAGS
00 140 302 151 000        JFZ P2   /GO GET APRIME
00 143 167                LM A
00 144 043                INX HL
00 145 167                LM A
00 146 303 205 000        JMP P3   /GO GET ANGLE
00 151 306 120      P2,   ADI 120  /ADD DECIMAL 50
00 153 047                DAA      /DECIMAL CORRECT
00 154 016 000            LCI 000  /CLEAR REGISTER C
00 156 312 170 000  P5,   JTZ P4   /C CONTAINS BINARY API
00 161 014                INC      /INCREMENT BINARY API
00 162 306 231            ADI 231  /ADD DECIMAL -1
00 164 047                DAA      /DECIMAL CORRECT
00 165 303 156 000        JMP P5   /GO TEST FOR END
00 170 171          P4,   LA C     /GET BINARY API
00 171 007                RLC      /MULTIPLY API BY 2
00 172 306 300            ADI 300  /ADJUST A PRIME ADDRESS LOW
00 174 117                LC A     /SET UP A PRIME ADDRESS LOW IN REG C
00 175 006 007            LBI 'APMT        /SET UP A PRIME ADDRESS HIGH
00 177 012                LDAX BC  /GET A PRIME D1,D0
00 200 167                LM A     /STORE IN MEMORY
00 201 003                INX BC   /INCREMENT TABLE ADDRESS
00 202 043                INX HL   /INCREMENT MEMORY ADDRESS
00 203 012                LDAX BC  /GET A PRIME D3,D2
00 204 167                LM A     /STORE IN MEMORY
00 205 043          P3,   INX HL   /INCREMENT MEMORY ADDRESS
00 206 257                XR A     /CLEAR ACCUMULATOR
00 207 062 044 075        STA BCK1         /CLEAR BACKWARDS FLAG
00 212 333 030            INP 030  /GET ANGLE F D1,D0
00 214 167                LM A     /STORE IN MEMORY
00 215 043                INX HL   /INCREMENT MEMORY ADDRESS
00 216 333 027            INP 027  /GET ANGLE F D2
00 220 346 017            NDI 017  /MASK OFF EOS SWITCH
00 222 167                LM A     /STORE IN MEMORY
00 223 043                INX HL   /INCREMENT MEMORY ADDRESS
00 224 001 020 075        LXI BC AF        /SET UP AUGEND ADDRESS
00 227 021 000 075        LXI DE AI        /SET UP SUBTRAHEND ADDRESS
00 232 315 362 002        CAL SUB4         /GET DELTA A
00 235 053                DCX HL   /POINT TO D3,D2 BYTE
00 236 176                LA M     /GET DELTA A D3,D2
00 237 346 017            NDI 017  /MASK OFF SIGN DIGIT
00 241 376 011            CPI 011  /COMPARE MSD WITH DECIMAL 9
00 243 302 262 000        JFZ P6   /DELTA A OK
00 246 257                XR A     /CLEAR ACCUMULATOR
00 247 167                LM A     /SET DELTA A D3,D2 TO ZERO
00 250 053                DCX HL   /DECREMENT MEMORY ADDRESS
00 251 076 231            LAI 231  /LOAD 99 FOR 9'S COMPLEMENT
00 253 062 044 075        STA BCK1         /ANGLE IS NEGATIVE
00 256 226                SU M     /CALCULATE THE
00 257 306 001            ADI 1    /POSITIVE ANGULAR
00 261 047                DAA      /DISPLACEMENT
00 262 167          P6,   LM A     /SET DELTA A D1,D0 TO ZERO
```

```
00 263 056 024              LLI T    /SET UP TEMP ADDRS LOW
00 265 333 026              INP 026 /GET TEMP D1,D0
00 267 167                  LM A     /STORE IN MEMORY
00 270 043                  INX HL   /INCREMENT MEMORY ADDRESS
00 271 333 025              INP 025 /GET TEMP D3,D2
00 273 167                  LM A     /STORE IN MEMORY
00 274 053                  DCX HL   /DECREMENT ADDRESS
00 275 176                  LA M     /GET TEMP D1,D0
00 276 306 005              ADI 005 /ADD DECIMAL 5
00 300 047                  DAA      /DECIMAL CORRECT
00 301 107                  LB A     /SAVE TEMP D1,D0 IN REG B
00 302 043                  INX HL   /INCREMENT MEMORY ADDRESS
00 303 176                  LA M     /GET TEMP D3,D2
00 304 316 000              ACI 000 /ADD IN CARRY TO D3,D2
00 306 047                  DAA      /DECIMAL CORRECT
00 307 362 335 000          JFS PSTV          /TEMP IS POSITIVE
00 312 066 231         NEGT,LMI 231     /SET TEMP D3,D2 TO 99 DECIMAL
00 314 347                  RST @400          /SWAP D3,D2
00 315 346 360              NDI 360 /MASK OFF D3
00 317 053                  DCX HL   /DECREMENT ADDRESS TO D1,D0
00 320 167                  LM A     /SAVE IN MEMORY
00 321 170                  LA B     /GET TEMP D1,D0
00 322 347                  RST @400          /SWAP D1,D0
00 323 346 017              NDI 017 /MASK OFF D0
00 325 206                  AD M     /MERGE TEMP D2,D1
00 326 306 140              ADI 140 /ADD DECIMAL 60
00 330 047                  DAA      /DECIMAL CORRECT
00 331 167                  LM A     /STORE DELTA T
00 332 303 015 001          JMP AITL          /GO SET ANGLE I ← ANGLE F
00 335 347             PSTV,RST @400    /SWAP D3,D2
00 336 117                  LC A     /SAVE D2 IN REG C
00 337 346 017              NDI 017 /MASK OFF D2
00 341 167                  LM A     /STORE DELTA T D3,D2
00 342 053                  DCX HL   /DECREMENT ADDRESS TO TEMP D1,D0
00 343 171                  LA C     /GET TEMP D3,D2
00 344 346 360              NDI 360 /MASK OFF D3
00 346 117                  LC A     /SAVE D2,0 IN REG C
00 347 170                  LA B     /GET TEMP D1,D0
00 350 347                  RST @400          /SWAP D1,D0
00 351 346 017              NDI 017 /MASK OFF D0
00 353 201                  AD C     /MERGE D2,D1
00 354 167                  LM A     /STORE IN DELTA T D1,D0
00 355 043                  INX HL   /POINT TO DELTA T BYTE 2
00 356 176                  LA M     /GET BYTE
00 357 066 000              LMI 000 /SET DELTA T D3,D2 TO ZERO
00 361 247                  ND A     /SET FLAGS
00 362 053                  DCX HL   /GO BACK TO BYTE 1
00 363 176                  LA M     /GET T D1, D0
00 364 302 011 001          JFZ OV60          /T IS OVER 60, GO SUB 60
00 367 376 140              CPI 140 /COMPARE TO DECIMAL 60
00 371 322 011 001          JFC OV60          /T IS OVER 60
00 374 076 232              LAI 232 /LOAD A WITH 9A, HEX
00 376 226                  SU M     /GENERATE 9'S COMPLEMENT OF D1,D0
00 377 306 140              ADI 140 /SUBTRACT DECIMAL 60
01 001 047                  DAA      /DECIMAL CORRECT
01 002 167                  LM A     /SAVE DELTA T D1,D0
01 003 043                  INX HL   /INCR MEM ADDR
01 004 066 231              LMI 231 /SET ADD-SUB
01 006 303 015 001          JMP AITL          /CONTINUE
01 011 306 100         OV60,ADI 100     /T IS <60, SUB 60
01 013 047                  DAA      /DECIMAL CORRECT
01 014 167                  LM A     /SAVE DELTA T D1,D0
01 015 041 000 075 AITL,LXI HL AI   /LOAD HL WITH ADDRESS OF AI
01 020 021 020 075          LXI DE AF         /LOAD DE WITH ADDRESS OF AF
01 023 032                  LDAX DE /GET AF D1,D0
01 024 167                  LM A     /STORE IN AI D1,D0
01 025 023                  INX DE   /INCREMENT AF ADDRESS
01 026 043                  INX HL   /INCREMENT AI ADDRESS
01 027 032                  LDAX DE /GET AF D3,D2
01 030 167                  LM A     /STORE IN AI D3,D2
01 031 001 022 075          LXI BC DLTA       /SET UP DELTA A ADDRESS
01 034 021 012 075          LXI DE GPRV       /SET UP GAL PER REVOLUTION AB
01 037 041 027 075          LXI HL DLTV       /SET UP PRODUCT ADDRESS
01 042 345                  PSHX HL /SAVE PRODUCT ADDRESS
01 043 315 056 003          CAL MPY /GET PRODUCT
```

```
01 046 341              POPX HL /RESTORE PRODUCT ADDRESS
01 047 353              DE<>HL  /SET UP OPERAND ADDRESS IN DE
01 050 001 006 075      LXI BC V60      /SET UP V60 ADDRESS IN BC
01 053 140              LH B    /SET SUM ADDRESS HIGH TO V60
01 054 151              LL C    /SET SUM ADDRESS LOW TO V60
01 055 325              PSHX DE /SAVE DELTA V ADDRESS
01 056 072 044 075      LDA BCK1        /GET BACKWARDS FLAG
01 061 247              ND A    /SET FLAGS
01 062 312 076 001      JTZ ADGL        /ANGLE IS POSITIVE
01 065 315 375 002      CAL SUB8        /ANGLE IS NEGATIVE
01 070 322 000 000      JFC 000000      /VOLUME IS NEGATIVE-SET = 0
01 073 303 101 001      JMP NDOP        /GO RESTORE REGISTERS
01 076 315 337 002 ADGL, CAL ADD8  /ADD DELTA V TO V60
01 101 321         NDOP, POPX DE   /RESTORE DELTA V ADDRESS
01 102 023              INX DE  /TRUNCATE TWO LOWER DIGITS
01 103 001 025 075      LXI BC T+1      /SET UP DELTA T ADDRESS
01 106 012              LDAX BC /GET D3,D2(SIGN) OF DELTA T
01 107 041 026 075      LXI HL ADSB     /SET UP SIGN STORAGE ADDRESS
01 112 167              LM A    /SAVE DELTA T SIGN
01 113 257              XR A    /CLEAR ACCUMULATOR
01 114 002              STAX BC /CLEAR D3,D2 OF DELTA T
01 115 013              DCX BC  /SET DELTA T ADDRESS TO LOW BYTE
01 116 043              INX HL  /POINT HL TO DELTA V
01 117 345              PSHX HL /SAVE PRODUCT ADDRESS
01 120 315 056 003      CAL MPY /GET PRODUCT OF DELTA T X DELTA V
01 123 341              POPX HL /RESTORE PRODUCT ADDRESS
01 124 016 002          LCI 002 /SET LOOP COUNT
01 126 345              PSHX HL /SAVE HL ADDRESS
01 127 315 033 003      CAL MOVE        /GO MOVE ONE DIGIT
01 132 341              POPX HL /RESTORE HL ADDRESS
01 133 001 016 075      LXI BC APRM     /SET UP A PRIME ADDRESS
01 136 124              LD H    /SET D TO DELTA V ADDRESS HIGH
01 137 135              LE L    /SET E TO DELTA V ADDRESS LOW
01 140 345              PSHX HL /SAVE PRODUCT ADDRESS
01 141 315 056 003      CAL MPY /GET PRODUCT
01 144 341              POPX HL /RESTORE PRODUCT ADDRESS
01 145 124              LD H    /COPY ADDRESS HIGH
01 146 135              LE L    /COPY ADDRESS LOW
01 147 023              INX DE  /ADD 1 TO ADDRESS
01 150 023              INX DE  /ADD 1 TO ADDRESS
01 151 032              LDAX DE /GET DIGITS 34
01 152 167              LM A    /SAVE IN 78
01 153 257              XR A    /CLEAR ACCUMULATOR
01 154 022              STAX DE /CLEAR DIGITS 34
01 155 023              INX DE  /SHIFT ADDRESS 1
01 156 043              INX HL  /SHIFT ADDRESS 2
01 157 032              LDAX DE /GET DIGITS 12
01 160 167              LM A    /SAVE IN 56
01 161 257              XR A    /CLEAR ACCUMULATOR
01 162 022              STAX DE /CLEAR DIGITS 12
01 163 353              DE<>HL  /GET SECOND BYTE ADDRESS
01 164 033              DCX DE  /DECREMENT OPERAND ADDRESS IN DE
01 165 001 006 075      LXI BC V60      /SET OPERAND ADDRESS = V60
01 170 140              LH B    /SET SUM ADDRESS HIGH TO V60 ADDRESS
01 171 151              LL C    /SET SUM ADDRESS LOW TO V60 ADDRESS
01 172 033              DCX DE  /POINT DE AT ADD-SUBTRACT FLAG
01 173 072 044 075      LDA BCK1        /GET NEG ANGLE FLAG
01 176 247              ND A    /SET FLAGS
01 177 312 210 001      JTZ OKSN        /ANGLE IS POSITIVE
01 202 076 231          LAI 231 /LOAD A WITH 99
01 204 353              DE<>HL  /PUT ADDRESS IN HL
01 205 226              SU M    /COMPLEMENT ADD-SUB FLAG
01 206 167              LM A    /PUT FLAG BACK
01 207 353              DE<>HL  /RESTORE ADDRESSES
01 210 032         OKSN, LDAX DE  /GET SIGN OF DELTA T
01 211 023              INX DE  /RESTORE DE ADDRESS TO DELTA V
01 212 376 231          CPI 231 /COMPARE TO 99 DECIMAL
01 214 345              PSHX HL /SAVE V60 ADDRESS
01 215 312 226 001      JTZ AD1 /GO ADD TERM TO V60
01 220 315 375 002 SUBT,CAL SUB8   /SUBTRACT CORRECTION FROM V60
01 223 303 231 001      JMP PRIC        /GO CALCULATE PRICE
01 226 315 337 002 AD1, CAL ADD8   /ADD CORRECTION TO V60
01 231 341         PRIC,POPX HL    /RESTORE V50 ADDRESS
01 232 175              LA L    /GET V60 ADDRESS LOW
01 233 306 003          ADI 003 /POINT TO HIGH BYTE
```

```
01 235 157              LL A    /RESTORE V60 ADDRESS LOW
01 236 124              LD H    /COPY V60 ADDRESS HIGH INTO D
01 237 036 002          LEI AMT /SET DE TO AMOUNT OF SALE ADDRESS
01 241 176              LA M    /GET D1,D2 OF V60
01 242 022              STAX DE /PUT INTO AMOUNT LOW BYTE
01 243 023              INX DE  /INCREMENT AMOUNT ADDRESS
01 244 257              XR A    /CLEAR ACCUMULATOR
01 245 022              STAX DE /PUT 00 INTO 2ND BYTE OF AMOUNT
01 246 033              DCX DE  /SET UP MPY OPERAND 2 ADDRESS
01 247 016 014          LCI AMTG        /SET UP MPY OPERAND 1 ADDRESS
01 251 102              LB D    /SET UP MPY OPERAND 1 ADDRESS HIGH
01 252 153              LL E    /SET PROD ADDR LOW TO TMP1 ADDR LOW
01 253 345              PSHX HL /SAVE TMP1 ADDRESS
01 254 315 056 003      CAL MPY /GET PRODUCT
01 257 341              POPX HL /GET TMP1 ADDRESS
01 260 175              LA L    /GET ADDRESS LOW
01 261 306 003          ADI 003 /POINT TO TOP BYTE
01 263 137              LE A    /SET DE TO AMOUNT MSB ADDRESS
01 264 157              LL A    /SET HL TO AMOUNT MSB ADDRESS
01 265 033              DCX DE  /SET DE TO 3RD BYTE OF AMOUNT
01 266 032              LDAX DE /GET 3RD BYTE
01 267 167              LM A    /PUT INTO 4TH BYTE
01 270 033              DCX DE  /DECR DE TO 2ND BYTE
01 271 053              DCX HL  /DECR HL TO 3RD BYTE
01 272 032              LDAX DE /GET SECOND BYTE
01 273 167              LM A    /PUT INTO THIRD BYTE
01 274 033              DCX DE  /DECR DE TO 1ST BYTE
01 275 053              DCX HL  /DECR HL TO 2ND BYTE
01 276 032              LDAX DE /GET 1ST BYTE
01 277 167              LM A    /PUT INTO 2ND BYTE
01 300 257              XR A    /CLEAR ACCUMULATOR
01 301 022              STAX DE /PUT 00 INTO FIRST BYTE
01 302 001 007 075      LXI BC V60+1    /SET UP MPY OPERAND 1
01 305 021 014 075      LXI DE AMTG     /SET UP MPY OPERAND 2
01 310 041 027 075      LXI HL DLTV     /SET PRODUCT ADDRESS TO DELTV
01 313 345              PSHX HL /SAVE PRODUCT ADDRESS
01 314 315 056 003      CAL MPY /GET PRODUCT
01 317 341              POPX HL /RESTORE PRODUCT ADDRESS
01 320 124              LD H    /POINT D TO RAM
01 321 135              LE L    /POINT E TO DELTA V BYTE 1
01 322 023              INX DE  /POINT E TO DELTA V BYTE 2
01 323 032              LDAX DE /GET BYTE 2 OF DELTA V
01 324 167              LM A    /PUT INTO BYTE 1
01 325 023              INX DE  /POINT DE TO BYTE 3
01 326 043              INX HL  /POINT HL TO BYTE 2
01 327 032              LDAX DE /GET BYTE 3
01 330 167              LM A    /PUT INTO BYTE 2
01 331 023              INX DE  /POINT DE TO BYTE 4
01 332 043              INX HL  /POINT HL TO BYTE 3
01 333 032              LDAX DE /GET BYTE 4
01 334 167              LM A    /PUT INTO BYTE 3
01 335 257              XR A    /CLEAR ACCUMULATOR
01 336 022              STAX DE /PUT INTO BYTE 4
01 337 033              DCX DE  /POINT DE TO BYTE 3
01 340 033              DCX DE  /BYTE 2
01 341 033              DCX DE  /BYTE 1
01 342 001 002 075      LXI BC AMT      /SET UP AMOUNT ADDRESS
01 345 151              LL C    /POINT HL TO AMOUNT
01 346 345              PSHX HL /SAVE AMOUNT ADDRESS
01 347 315 337 002      CAL ADD8        /ADD TO AMOUNT
01 352 341              POPX HL /GET AMOUNT ADDRESS
01 353 021 033 075      LXI DE TMP1     /SET UP COPY ADDRESS
01 356 325              PSHX DE /SAVE TMP1 ADDRESS
01 357 315 324 002      CAL COPY        /COPY AMOUNT INTO TMP1
01 362 341              POPX HL /PUT TMP1 ADDRESS INTO HL
01 363 072 036 075      LDA TMP1+3      /GET AMOUNT MSB
01 366 346 360          NDI 360 /MASK OFF 2ND DIGIT
01 370 312 023 002      JTZ XPRC        /UNDER $100- OUTPUT 5 MSD
01 373 016 004          LCI 004 /OVER $100- OUTPUT 5 MSD
01 375 345              PSHX HL /SAVE AMOUNT ADDRESS
01 376 315 033 003      CAL MOVE        /SHIFT RIGHT ONE DIGIT
02 001 341              POPX HL /RESTORE AMOUNT ADDRESS
02 002 043              INX HL  /POINT HL TO D4D5 BYTE
02 003 176              LA M    /GET BYTE
02 004 323 025          OUT 025 /OUTPUT AMOUNT D1,D0
```

```
02 006 043              INX HL  /POINT HL TO D2D3 BYTE
02 007 176              LA M    /GET BYTE
02 010 323 024          OUT 024 /OUTPUT AMOUNT D3,D2
02 012 043              INX HL  /POINT HL TO XD1 BYTE
02 013 176              LA M    /GET BYTE
02 014 323 023          OUT 023 /OUTPUT AMOUNT D1
02 016 323 026          OUT 026 /MOVE AMOUNT DECIMAL POINT
02 020 303 037 002      JMP OUTV        /GO DISPLAY V60
02 023 043        XPRC,INX HL   /POINT HL TO D5D6 BYTE
02 024 176              LA M    /GET BYTE
02 025 323 025          OUT 025 /OUTPUT AMOUNT D1,D0
02 027 043              INX HL  /POINT HL TO D3D4 BYTE
02 030 176              LA M    /GET BYTE
02 031 323 024          OUT 024 /OUTPUT AMOUNT D3,D2
02 033 043              INX HL  /POINT HL TO D1D2 BYTE
02 034 176              LA M    /GET BYTE
02 035 323 023          OUT 023 /OUTPUT AMOUNT D1
02 037 041 006 075 OUTV,LXI HL V60 /POINT HL TO V60
02 042 021 033 075      LXI DE TMP1     /SET UP COPY ADDRESS
02 045 325              PSHX DE /SAVE TMP1 ADDRESS
02 046 315 324 002      CAL COPY        /COPY V60 INTO TMP1
02 051 341              POPX HL /PUT TMP1 ADDRESS INTO HL
02 052 016 004          LCI 004 /SET BYTE COUNT
02 054 345              PSHX HL /SAVE V60 ADDRESS
02 055 315 033 003      CAL MOVE        /SHIFT RIGHT ONE DIGIT
02 060 341              POPX HL /RESTORE V60 ADDRESS
02 061 043              INX HL  /POINT TO V60 D4D5 BYTE
02 062 176              LA M    /GET BYTE
02 063 323 022          OUT 022 /OUTPUT V60 D1,D0
02 065 043              INX HL  /POINT HL TO D2D3 BYTE
02 066 176              LA M    /GET BYTE
02 067 323 021          OUT 021 /OUTPUT V60 D3,D2
02 071 043              INX HL  /POINT HL TO XD1 BYTE
02 072 176              LA M    /GET BYTE
02 073 323 020          OUT 020 /OUTPUT V60 D1
02 075 333 027          INP 027 /GET EOS SWITCH
02 077 247              ND A    /SET FLAGS
02 100 372 114 002      JTS EOS /END OF SALE
02 103 041 020 075      LXI HL AF       /NOT END OF SALE
02 106 315 307 002      CAL WAIT        /WAIT FOR BIG DELTA A
02 111 303 206 000      JMP P3+1        /GO GET NEXT DELTA VOLUME
02 114 041 004 075 EOS, LXI HL AMT+2    /SET UP AMOUNT BYTE 3 ADDRESS
02 117 176              LA M    /GET BYTE
02 120 306 005          ADI 005 /ADD DECIMAL 5
02 122 047              DAA     /DECIMAL CORRECT
02 123 167              LM A    /PUT BYTE BACK
02 124 043              INX HL  /POINT TO BYTE 4
02 125 176              LA M    /GET BYTE
02 126 316 000          ACI 000 /ADD IN CARRY
02 130 167              LM A    /PUT BYTE BACK
02 131 053              DCX HL  /GO BACK TO BYTE 3
02 132 016 002          LCI 002 /SET BYTE COUNT
02 134 345              PSHX HL /SAVE AMOUNT + 2 ADDRESS
02 135 315 033 003      CAL MOVE        /SHIFT RIGHT ONE DIGIT
02 140 341              POPX HL /RESTORE AMOUNT + 2 ADDRESS
02 141 176              LA M    /PUT BYTE 3 INTO ACCUMULATOR
02 142 247        DLRS,ND A     /SET FLAGS
02 143 312 163 002      JTZ X100        /UNITS,TENS ARE ZEROES
02 146 306 231          ADI 231 /COUNT DOWN
02 150 047              DAA     /DECIMAL CORRECT
02 151 323 030          OUT 030 /ADD $ TO COUNTER
02 153 365              PSHX PSW        /SAVE STATUS
02 154 315 307 002      CAL WAIT        /WAIT 33MS
02 157 361              POPX PSW        /RESTORE STATUS
02 160 303 142 002      JMP DLRS        /GO CHECK FOR END
02 163 043        X100,INX HL   /SET AMOUNT BYTE 4 ADDRESS
02 164 176              LA M    /GET BYTE
02 165 346 017    SETF,NDI 017  /MASK OFF TOP, SET FLAGS
02 167 312 215 002      JTZ GALS        /GO COUNT GALLONS
02 172 006 144          LBI 144 /LOAD B WITH 100
02 174 323 030    COUT,OUT 030  /COUNT $
02 176 365              PSHX PSW        /SAVE A , FLAGS
02 177 305              PSHX BC /SAVE BC
02 200 315 307 002      CAL WAIT        /WAIT 33MS
02 203 301              POPX BC /RESTORE BC
```

```
02 204 361                    POPX PSW        /RESTORE A, FLAGS
02 205 005                    DCB     /BUMP LOOP COUNT
02 206 302 174 002            JFZ COUT        /NOT 100 YET
02 211 075                    DCA     /100 ALREADY
02 212 303 165 002            JMP SETF        /GO SEE IF LAST 100
02 215 043              GALS,INX HL   /POINT TO V60 LSB
02 216 043                    INX HL  /POINT TO V60 2ND BYTE
02 217 043                    INX HL  /3RD BYTE
02 220 176                    LA M    /GET BYTE
02 221 306 120                ADI 120 /ADD 50 DECIMAL
02 223 047                    DAA     /DECIMAL CORRECT
02 224 043                    INX HL  /POINT TO 4TH BYTE
02 225 176                    LA M    /GET BYTE
02 226 316 000                ACI 000 /ADD IN CARRY
02 230 047                    DAA     /DECIMAL CORRECT
02 231 332 362 003            JTC ERR /V60 OVERFLOW
02 234 312 254 002 BUMP,JTZ SPIN   /GO CHECK FOR START OF SALE (SOS)
02 237 323 027     BMP2,OUT 027    /INCR COUNTER
02 241 365                    PSHX PSW        /SAVE ACCUMULATOR
02 242 315 307 002            CAL WAIT        /WAIT 33MS
02 245 361                    POPX PSW        /RESTORE STATUS
02 246 306 231                ADI 231 /ADD DECIMAL -1
02 250 047                    DAA     /DECIMAL CORRECT
02 251 303 234 002            JMP BUMP        /MORE GALLONS
02 254 333 027     SPIN,INP 027    /GET EOS SWITCH
02 256 247                    ND A    /SET FLAGS
02 257 372 254 002            JTS SPIN        /NOT SOS YET
02 262 006 017                LBI 017 /SET LOOP COUNTER
02 264 305         TIME,PSHX BC    /SAVE BC
02 265 315 307 002            CAL WAIT        /GO WAIT 33MS
02 270 301                    POPX BC /RESTORE BC
02 271 005                    DCB     /BUMP LOOP COUNT
02 272 302 264 002            JFZ TIME        /STILL LOOPING
02 275 333 027                INP 027 /GET EOS SWITCH
02 277 247                    ND A    /SET FLAGS
02 300 372 254 002            JTS SPIN        /FALSE START, GOTRY AGAIN
02 303 315 232 007            CAL TSTD        /GO TEST DISPLAYS
02 306 307                    RST @000        /START OF SALE -- GO INITIAL
02 307 006 020     WAIT,LBI 020    /SET UP OUTER LOOP COUNT------------
02 311 016 000     OUTR,LCI 000    /SET UP INNER LOOP COUNT------------
02 313 015         INNR,DCC        /DECR INNER LOOP
02 314 302 313 002            JFZ INNR        /END INNER?
02 317 005                    DCB     /DECR OUTER LOOP
02 320 302 311 002            JFZ OUTR        /END?
02 323 311                    RET     /END OF WAIT SUBROUTINE
02 324 006 004     COPY,LBI 004    /SET LOOP COUNT----------------------
02 326 176         CMRE,LA M       /GET BYTE-------------------------
02 327 022                    STAX DE /PUT INTO DE
02 330 043                    INX HL  /INCREMENT SOURCE ADDRESS
02 331 023                    INX DE  /INCREMENT DEST ADDRESS
02 332 005                    DCB     /BUMP LOOP COUNT
02 333 302 326 002            JFZ CMRE        /GO COPY NEXT BYTE
02 336 311                    RET     /END OF COPY SUBROUTINE
02 337 257         ADD8,XR A       /CLEAR ACCUMULATOR------------------
02 340 325                    PSHX DE /PUT DE ON STACK--------------------
02 341 026 004                LDI 004 /SET LOOP COUNT
02 343 343         XCHG,SP<>HL     /SWAP STACK DE, HL
02 344 012                    LDAX BC /GOT OPERAND 1 BYTE
02 345 216                    AC M    /ADD OPERAND 2 BYTE, CARRY
02 346 047                    DAA     /DECIMAL CORRECT
02 347 043                    INX HL  /INCR OPERAND 2 ADDRESS
02 350 343                    SP<>HL  /SWAP STACK HL, HL DE
02 351 167                    LM A    /PUT BYTE INTO SUM
02 352 003                    INX BC  /INCREMENT OPERAND 1 ADDRESS
02 353 043                    INX HL  /INCREMENT SUM ADDRESS
02 354 025                    DCD     /BUMP LOOP COUNT
02 355 302 343 002            JFZ XCHG        /GO ADD MORE BYTES
02 360 321                    POPX DE /UNLOAD STACK
02 361 311                    RET     /END OF ADD8 SUBROUTINE
02 362 325         SUB4,PSHX DE    /PUT SUBTRAHEND ADDRESS ON STACK-----
02 363 120                    LD B    /MOVE MINUEND ADDRESS---------------
02 364 131                    LE C    /TO DE
02 365 006 002                LBI 002 /SET LOOP COUNT
02 367 067         STC, SETC       /SET CARRY TO START
02 370 303 005 003            JMP SUB /SUBTRACT
```

```
02 373 321          RTRN,POPX DE    /UNLOAD STACK
02 374 311               RET        /END OF SUB4 SUBROUTINE
02 375 325          SUB8,PSHX DE    /PUT ADDRESS OF SUBTRAHEND ON STACK
02 376 120               LD B       /MOVE MIN ADDRESS TO
02 377 131               LE C       /DE
03 000 006 004           LBI 004 /SET LOOP COUNT
03 002 303 367 002       JMP STC /CONTINUE
03 005 343          SUB, SP<>HL     /HL←SUBTR, STACK←DIFF
03 006 076 231           LAI 231 /LOAD 99 FOR 9'S COMPLEMENT
03 010 316 000           ACI 000 /ADD IN CARRY
03 012 226               SU M       /TAKE 9'S COMPLEMENT OF SUBTRAHEND
03 013 353               DE<>HL     /HL←MIN, DE←SUBTRAHEND
03 014 206               AD M       /ADD MINUEND
03 015 047               DAA        /DECIMAL CORRECT
03 016 353               DE<>HL     /HL←SUBTRAHEND, DE←MINUEND
03 017 043               INX HL     /INCREMENT SUBTRAHEND ADDRESS
03 020 343               SP<>HL     /HL←DIFF, STACK←SUBTRAHEND
03 021 167               LM A       /PUT BYTE INTO DIFFERENCE
03 022 023               INX DE     /INCREMENT MINUEND ADDRESS
03 023 043               INX HL     /INCREMENT DIFF ADDRESS
03 024 005               DCB        /BUMP LOOP COUNT
03 025 302 005 003       JFZ SUB /GO SUBTRACT NEXT BYTE
03 030 303 373 002       JMP RTRN           /END OF SUBTRACT
03 033 176          MOVE,LA M       /GET BYTE-----------------------------
03 034 347               RST @400           /SWAP HALVES
03 035 346 017           NDI 017 /MASK OFF TOP
03 037 107               LB A       /SAVE IN B
03 040 043               INX HL     /POINT TO NEXT BYTE
03 041 176               LA M       /GET BYTE
03 042 347               RST @400           /SWAP HALVES
03 043 346 360           NDI 360 /MASK OFF BOTTOM
03 045 200               AD B       /ADD BOTTOM DIGIT TO BYTE
03 046 053               DCX HL     /POINT TO PRECEDING ADDRESS
03 047 167               LM A       /SAVE FIRST BYTE IN FIRST ADDRESS
03 050 043               INX HL     /POINT TO NEXT ADDRESS
03 051 015               DCC        /DECREMENT LOOP COUNTER
03 052 302 033 003       JFZ MOVE           /LOOP AGAIN
03 055 311               RET        /END OF MOVE SUBROUTINE
03 056 345          MPY, PSHX HL    /SAVE PRODUCT ADDRESS
03 057 151               LL C       /PUT OPERAND 2 ADDRESS INTO HL
03 060 016 037           LCI TMP2           /PUT TMP2 ADDRESS INTO BC
03 062 305               PSHX BC /SAVE TMP2 ADDRESS IN STACK
03 063 257               XR A       /CLEAR ACCUMULATOR
03 064 002               STAX BC /CLEAR TMP2
03 065 003               INX BC
03 066 002               STAX BC
03 067 003               INX BC
03 070 002               STAX BC
03 071 003               INX BC
03 072 002               STAX BC
03 073 006 000           LBI 000 /SET INITIAL PRODUCT PAIR
03 075 337               RST @300           /GET PRODUCT OF FIRST DIGITS
03 076 317               RST @100           /ADD TO TMP 2
03 077 006 020           LBI 020 /PRODUCT 10
03 101 337               RST @300           /GET PRODUCT 10
03 102 327               RST @200           /ADD TO TOP OF BYTE 1
03 103 006 001           LBI 001 /PRODUCT 01
03 105 337               RST @300           /GET PRODUCT 01
03 106 327               RST @200           /ADD TO TOP OF FIRST BYTE
03 107 006 040           LBI 040 /PRODUCT 20
03 111 343               SP<>HL  /GET TMP2 ADDRESS
03 112 043               INX HL  /INCR TMP2 ADDRS TO BYTE 2
03 113 343               SP<>HL  /PUT TMP2 ADDRESS BACK
03 114 337               RST @300           /GET PRODUCT 20
03 115 317               RST @100           /ADD TO BYTE 2
03 116 006 021           LBI 021 /PRODUCT 11
03 120 337               RST @300           /GET PRODUCT 11
03 121 317               RST @100           /ADD TO BYTE 2
03 122 006 002           LBI 002 /PRODUCT 02
03 124 337               RST @300           /GET PRODUCT 02
03 125 317               RST @100           /ADD TO BYTE 2
03 126 006 060           LBI 060 /PRODUCT 30
03 130 337               RST @300           /GET PRODUCT 30
03 131 327               RST @200           /ADD TO TOP OF BYTE 2
03 132 006 041           LBI 041 /PRODUCT 21
```

```
03 134 337           RST @300       /GET PRODUCT 21
03 135 327           RST @200       /ADD TO TOP OF BYTE 2
03 136 006 022       LBI 022 /PRODUCT 12
03 140 337           RST @300       /GET PRODUCT 12
03 141 327           RST @200       /ADD TO TOP OF BYTE 2
03 142 006 003       LBI 003 /PRODUCT 03
03 144 337           RST @300       /GET PRODUCT 03
03 145 327           RST @200       /ADD TO TOP OF BYTE 2
03 146 006 061       LBI 061 /PRODUCT 31
03 150 343           SP<>HL  /GET TMP2 BYTE 2 ADDRESS
03 151 043           INX HL  /POINT TO BYTE 3
03 152 343           SP<>HL  /PUT ADDRESS BACK
03 153 337           RST @300       /GET PRODUCT 31
03 154 317           RST @100       /ADD TO BYTE 3
03 155 006 042       LBI 042 /PRODUCT 22
03 157 337           RST @300       /GET PRODUCT 22
03 160 317           RST @100       /ADD TO BYTE 3
03 161 006 023       LBI 023 /PRODUCT 13
03 163 337           RST @300       /GET PRODUCT 13
03 164 317           RST @100       /ADD TO BYTE 3
03 165 006 062       LBI 062 /PRODUCT 32
03 167 337           RST @300       /GET PRODUCT 32
03 170 327           RST @200       /ADD TO TOP OF BYTE 3
03 171 006 043       LBI 043 /PRODUCT 23
03 173 337           RST @300       /GET PRODUCT 23
03 174 327           RST @200       /ADD TO TOP OF BYTE 3
03 175 006 063       LBI 063 /PRODUCT 33
03 177 343           SP<>HL  /GET TMP2 BYTE 3 ADDRESS
03 200 043           INX HL  /POINT TO BYTE 4
03 201 343           SP<>HL  /PUT ADDRESS BACK
03 202 337           RST @300       /GET PRODUCT 33
03 203 317           RST @100       /ADD TO BYTE 4
03 204 341           POPX HL /PUT TMP2 ADDRESS INTO HL
03 205 056 037       LLI TMP2       /POINT TO TMP2 FIRST BYTE
03 207 321           POPX DE /PUT PRODUCT ADDRESS IN DE
03 210 315 324 002   CAL COPY       /TRANSFER TO PRODUCT
03 213 311           RET     /END OF MULTIPLY MAIN ROUTINE
03 214 325     PROD,PSHX DE  /SAVE OPERAND 1 ADDRESS--------------
03 215 345           PSHX HL /SAVE OPERAND 2 ADDRESS--------------
03 216 170           LA B    /GET PRODUCT PAIR BYTE
03 217 346 040       NDI 040 /MASK DE BYTE BIT
03 221 312 225 003   JTZ ARND       /DIGIT IN FIRST BYTE
03 224 023           INX DE  /DIGIT IN 2ND BYTE
03 225 032     ARND,LDAX DE  /GET BYTE
03 226 117           LC A    /SAVE IN C
03 227 170           LA B    /GET PRODUCT PAIR BYTE
03 230 346 020       NDI 020 /DE TOP-BOTTOM BIT
03 232 171           LA C    /PUT BYTE IN A
03 233 312 237 003   JTZ MSKD       /DIGIT IS ON BOTTOM
03 236 347           RST @400       /SWAP DIGITS
03 237 346 017 MSKD,NDI 017  /TOP DIGIT NOW ON BOTTOM
03 241 117           LC A    /SAVE IN C
03 242 170           LA B    /GET PRODUCT PAIR BYTE
03 243 346 002       NDI 002 /MASK HL BYTE BIT
03 245 312 251 003   JTZ BYT1       /IN FIRST BYTE
03 250 043           INX HL  /IN 2ND BYTE
03 251 176     BYT1,LA M     /GET BYTE
03 252 127           LD A    /SAVE IN D
03 253 170           LA B    /GET PRODUCT PAIR BYTE
03 254 346 001       NDI 001 /HL TOP-BOTTOM BIT
03 256 172           LA D    /PUT BYTE IN ACCUMULATOR
03 257 302 263 003   JFZ MSK2       /ALREADY ON TOP- NO SWAP
03 262 347           RST @400       /SWAP DIGITS
03 263 346 360 MSK2,NDI 360  /MASK OFF BOTTOM DIGIT
03 265 201           AD C    /ADD FIRST DIGIT
03 266 117           LC A    /PUT TABLE ADDRESS LOW IN C
03 267 006 007       LBI 'TABLE     /SET UP TABLE ADDRESS HIGH IB
03 271 012           LDAX BC /GET PRODUCT
03 272 341           POPX HL /RESTORE OPERAND 2 ADDRESS
03 273 321           POPX DE /RESTORE OPERAND 1 ADDRESS
03 274 311           RET     /END OF PROD SUBROUTINE
03 275 073     ADB, DCX SP   /RESTORE STACK POINTER
03 276 073           DCX SP  /TO LAST ENTRY IN STACK
03 277 345           PSHX HL /SAVE HL IN STACK
03 300 151           LL C    /SET HL TO TMP2 ADDRESS
```

```
03 301 206              AD M     /ADD FIRST BYTE
03 302 047              DAA      /DECIMAL CORRECT
03 303 167              LM A     /PUT SUM BACK IN FIRST BYTE
03 304 365         CHK, PSHX PSW /SAVE FLAGS
03 305 175              LA L     /GET TMP2 ADDRESS
03 306 376 042          CPI TMP2+3      /IS IT LAST ADDRESS OF TMP2 ?
03 310 312 325 003      JTZ NMRE        /END OF ADD
03 313 043              INX HL   /INCR TMP2 ADDRESS
03 314 361              POPX PSW        /RESTORE FLAGS
03 315 176              LA M     /GET BYTE
03 316 316 000          ACI 000  /ADD IN CARRY
03 320 047              DAA      /DECIMAL CORRECT
03 321 167              LM A     /PUT SUM BACK
03 322 303 304 003      JMP CHK  /GO CHECK FOR END OF ADD
03 325 361         NMRE,POPX PSW /UNLOAD STACK
03 326 341              POPX HL  /RESTORE HL
03 327 311              RET      /END OF ADB SUBROUTINE
03 330 073         ADT, DCX SP   /RESTORE STACK POINTER
03 331 073              DCX SP   /TO LAST ENTRY IN STACK
03 332 345              PSHX HL  /SAVE HL IN STACK
03 333 151              LL C     /SET HL TO TMP2 ADDRESS
03 334 107              LB A     /COPY BYTE INTO B
03 335 347              RST @400        /SWAP DIGITS
03 336 346 360          NDI 360  /MASK OFF BOTTOM DIGIT
03 340 206              AD M     /ADD TO FIRST BYTE
03 341 047              DAA      /DECIMAL CORRECT
03 342 167              LM A     /PUT SUM INTO BYTE
03 343 043              INX HL   /INCR TMP2 ADDRESS
03 344 365              PSHX PSW        /SAVE FLAGS
03 345 170              LA B     /GET BYTE
03 346 347              RST @400        /SWAP DIGITS
03 347 346 017          NDI 017  /MASK OFF TOP DIGIT
03 351 107              LB A     /SAVE DIGIT IN B
03 352 361              POPX PSW        /RESTORE FLAGS
03 353 170              LA B     /PUT DIGIT IN A
03 354 216              AC M     /ADD NEXT BYTE WITH CARRY
03 355 047              DAA      /DECIMAL CORRECT
03 356 167              LM A     /PUT SUM INTO BYTE
03 357 303 304 003      JMP CHK  /GO ADD IN CARRY TO NEXT BYTE
03 362 076 240     ERR, LAI 240  /LOAD A WITH 100 DECIMAL-------------
03 364 303 237 002      JMP BMP2        /GO OUTPUT 100 COUNTS
       000 007     *003400
07 000 000         TABLE,#000    /00
07 001 000              #000     /01
07 002 000              #000     /02
07 003 000              #000     /03
07 004 000              #000     /04
07 005 000              #000     /05
07 006 000              #000     /06
07 007 000              #000     /07
07 010 000              #000     /08
07 011 000              #000     /09
07 012 000              #000     /0A
07 013 000              #000     /0B
07 014 000              #000     /0C
07 015 000              #000     /0D
07 016 000              #000     /0E
07 017 000              #000     /0F
07 020 000              #000     /10
07 021 001              #001     /11
07 022 002              #002     /12
07 023 003              #003     /13
07 024 004              #004     /14
07 025 005              #005     /15
07 026 006              #006     /16
07 027 007              #007     /17
07 030 010              #010     /18
07 031 011              #011     /19
07 032 000              #000     /1A
07 033 000              #000     /1B
07 034 000              #000     /1C
07 035 000              #000     /1D
07 036 000              #000     /1E
07 037 000              #000     /1F
07 040 000              #000     /20
```

```
Ø7 Ø41 ØØ2        #ØØ2    /21
Ø7 Ø42 ØØ4        #ØØ4    /22
Ø7 Ø43 ØØ6        #ØØ6    /23
Ø7 Ø44 Ø1Ø        #Ø1Ø    /24
Ø7 Ø45 Ø2Ø        #Ø2Ø    /25
Ø7 Ø46 Ø22        #Ø22    /26
Ø7 Ø47 Ø24        #Ø24    /27
Ø7 Ø5Ø Ø26        #Ø26    /28
Ø7 Ø51 Ø3Ø        #Ø3Ø    /29
Ø7 Ø52 ØØØ        #ØØØ    /2A
Ø7 Ø53 ØØØ        #ØØØ    /2B
Ø7 Ø54 ØØØ        #ØØØ    /2C
Ø7 Ø55 ØØØ        #ØØØ    /2D
Ø7 Ø56 ØØØ        #ØØØ    /2E
Ø7 Ø57 ØØØ        #ØØØ    /2F
Ø7 Ø6Ø ØØØ        #ØØØ    /3Ø
Ø7 Ø61 ØØ3        #ØØ3    /31
Ø7 Ø62 ØØ6        #ØØ6    /32
Ø7 Ø63 Ø11        #Ø11    /33
Ø7 Ø64 Ø22        #Ø22    /34
Ø7 Ø65 Ø25        #Ø25    /35
Ø7 Ø66 Ø3Ø        #Ø3Ø    /36
Ø7 Ø67 Ø41        #Ø41    /37
Ø7 Ø7Ø Ø44        #Ø44    /38
Ø7 Ø71 Ø47        #Ø47    /39
Ø7 Ø72 ØØØ        #ØØØ    /3A
Ø7 Ø73 ØØØ        #ØØØ    /3B
Ø7 Ø74 ØØØ        #ØØØ    /3C
Ø7 Ø75 ØØØ        #ØØØ    /3D
Ø7 Ø76 ØØØ        #ØØØ    /3E
Ø7 Ø77 ØØØ        #ØØØ    /3F
Ø7 1ØØ ØØØ        #ØØØ    /4Ø
Ø7 1Ø1 ØØ4        #ØØ4    /41
Ø7 1Ø2 Ø1Ø        #Ø1Ø    /42
Ø7 1Ø3 Ø22        #Ø22    /43
Ø7 1Ø4 Ø26        #Ø26    /44
Ø7 1Ø5 Ø4Ø        #Ø4Ø    /45
Ø7 1Ø6 Ø44        #Ø44    /46
Ø7 1Ø7 Ø5Ø        #Ø5Ø    /47
Ø7 11Ø Ø62        #Ø62    /48
Ø7 111 Ø66        #Ø66    /49
Ø7 112 ØØØ        #ØØØ    /4A
Ø7 113 ØØØ        #ØØØ    /4B
Ø7 114 ØØØ        #ØØØ    /4C
Ø7 115 ØØØ        #ØØØ    /4D
Ø7 116 ØØØ        #ØØØ    /4E
Ø7 117 ØØØ        #ØØØ    /4F
Ø7 12Ø ØØØ        #ØØØ    /5Ø
Ø7 121 ØØ5        #ØØ5    /51
Ø7 122 Ø2Ø        #Ø2Ø    /52
Ø7 123 Ø25        #Ø25    /53
Ø7 124 Ø4Ø        #Ø4Ø    /54
Ø7 125 Ø45        #Ø45    /55
Ø7 126 Ø6Ø        #Ø6Ø    /56
Ø7 127 Ø65        #Ø65    /57
Ø7 13Ø 1ØØ        #1ØØ    /58
Ø7 131 1Ø5        #1Ø5    /59
Ø7 132 ØØØ        #ØØØ    /5A
Ø7 133 ØØØ        #ØØØ    /5B
Ø7 134 ØØØ        #ØØØ    /5C
Ø7 135 ØØØ        #ØØØ    /5D
Ø7 136 ØØØ        #ØØØ    /5E
Ø7 137 ØØØ        #ØØØ    /5F
Ø7 14Ø ØØØ        #ØØØ    /6Ø
Ø7 141 ØØ6        #ØØ6    /61
Ø7 142 Ø22        #Ø22    /62
Ø7 143 Ø3Ø        #Ø3Ø    /63
Ø7 144 Ø44        #Ø44    /64
Ø7 145 Ø6Ø        #Ø6Ø    /65
Ø7 146 Ø66        #Ø66    /66
Ø7 147 1Ø2        #1Ø2    /67
Ø7 15Ø 11Ø        #11Ø    /68
Ø7 151 124        #124    /69
Ø7 152 ØØØ        #ØØØ    /6A
Ø7 153 ØØØ        #ØØØ    /6B
```

```
07 154 000                  #000    /6C
07 155 000                  #000    /6D
07 156 000                  #000    /6E
07 157 000                  #000    /6F
07 160 000                  #000    /70
07 161 007                  #007    /71
07 162 024                  #024    /72
07 163 041                  #041    /73
07 164 050                  #050    /74
07 165 065                  #065    /75
07 166 102                  #102    /76
07 167 111                  #111    /77
07 170 126                  #126    /78
07 171 143                  #143    /79
07 172 000                  #000    /7A
07 173 000                  #000    /7B
07 174 000                  #000    /7C
07 175 000                  #000    /7D
07 176 000                  #000    /7E
07 177 000                  #000    /7F
07 200 000                  #000    /80
07 201 010                  #010    /81
07 202 026                  #026    /82
07 203 044                  #044    /83
07 204 062                  #062    /84
07 205 100                  #100    /85
07 206 110                  #110    /86
07 207 126                  #126    /87
07 210 144                  #144    /88
07 211 162                  #162    /89
07 212 000                  #000    /8A
07 213 000                  #000    /8B
07 214 000                  #000    /8C
07 215 000                  #000    /8D
07 216 000                  #000    /8E
07 217 000                  #000    /8F
07 220 000                  #000    /90
07 221 011                  #011    /91
07 222 030                  #030    /92
07 223 047                  #047    /93
07 224 066                  #066    /94
07 225 105                  #105    /95
07 226 124                  #124    /96
07 227 143                  #143    /97
07 230 162                  #162    /98
07 231 201                  #201    /99
07 232 006 027      TSTD, LBI 27    /SET TIMER COUNT
07 234 076 210              LAI 210 /LOAD A WITH 88
07 236 323 020              OUT 20  /LIGHT ALL SEGMENTS
07 240 323 021              OUT 21
07 242 323 022              OUT 22
07 244 323 023              OUT 23
07 246 323 024              OUT 24
07 250 323 025              OUT 25
07 252 305          MRET, PSHX BC   /SAVE REGISTERS
07 253 315 307 002          CAL WAIT        /WAIT 33MS
07 256 301                  POPX BC /RESTORE REGISTERS
07 257 005                  DCB     /BUMP COUNT
07 260 302 252 007          JFZ MRET        /MORE TIME
07 263 311                  RET     /END TEST--GO CLEAR DISPLAYS
07 264 000                  #000    /B4
07 265 000                  #000    /B5
07 266 000                  #000    /B6
07 267 000                  #000    /B7
07 270 000                  #000    /B8
07 271 000                  #000    /B9
07 272 000                  #000    /BA
07 273 000                  #000    /BB
07 274 000                  #000    /BC
07 275 000                  #000    /BD
07 276 000                  #000    /BE
07 277 000                  #000    /BF
07 300 004 124      APMT, #052004D  /C0---API 50 A PRIME-----------------
07 302 201 124              #052201D        /C2     API 51
07 304 130 125              #052530D        /C4     API 52
```

```
07 306 102 126          #053102D        /C6     API 53
07 310 060 127          #053460D        /C8     API 54
07 312 027 130          #054027D        /CA     API 55
07 314 005 131          #054405D        /CC     API 56
07 316 222 131          #054622D        /CE     API 57
07 320 131 140          #060131D        /D0     API 58
07 322 060 141          #060460D        /D2     API 59
07 324 001 142          #061001D        /D4     API 60
07 326 162 142          #061162D        /D6     API 61
07 330 103 143          #061503D        /D8     API 62
07 332 024 144          #062024D        /DA     API 63
07 334 205 144          #062205D        /DC     API 64
07 336 126 145          #062526D        /DE     API 65
07 340 047 146          #063047D        /E0     API 66
07 342 230 146          #063230D        /E2     API 67
07 344 151 147          #063551D        /E4     API 68
07 346 100 150          #064100D        /E6     API 69
07 350 021 151          #064421D        /E8     API 70
07 352 202 151          #064602D        /EA     API 71
07 354 121 160          #070121D        /EC     API 72
07 356 040 161          #070440D        /EE     API 73
07 360 211 161          #070611D        /F0     API 74
07 362 130 162          #071130D        /F2     API 75
07 364 047 163          #071447D        /F4     API 76
07 366 227 163          #071627D        /F6     API 77
07 370 151 164          #072151D        /F8     API 78
07 372 100 165          #072500D        /FA     API 79
07 374 021 166          #073021D        /FC     API 80
07 376 203 166          #073203D        /FE     API 81
       000 075      *036400
75 000 000 000      AI,       #000000D
75 002 000 000      AMT,  #000000D
75 004 000 000                #000000D
75 006 000 000      V60,  #000000D
75 010 000 000                #000000D
75 012 000 000      GPRV, #000000D
75 014 000 000      AMTG, #000000D
75 016 000 000      APRM, #000000D
75 020 000 000      AF,       #000000D
75 022 000 000      DLTA, #000000D
75 024 000 000      T,        #000000D
75 026 000          ADSB, #000
75 027 000 000      DLTV, #000000D
75 031 000 000                #000000D
75 033 000 000      TMP1, #000000D
75 035 000 000                #000000D
75 037 000 000      TMP2, #000000D
75 041 000 000                #000000D
75 043 000          OVFL, #000
75 044 000          BCK1, #000
                    $
```

The B′ values, discussed above, are similarly included in the program. The values are as follows:

| B′ VALUES | | |
| --- | --- | --- |
| API° | B′ DIGITAL VALUE | OCTAL NUMBER FOR PROGRAM |
| 50 | 0.285 | 001205D |
| 51 | 0.320 | 001440D |
| 52 | 0.354 | 001524D |
| 53 | 0.389 | 001611D |
| 54 | 0.424 | 002044D |
| 55 | 0.458 | 002130D |
| 56 | 0.493 | 002233D |
| 57 | 0.528 | 002450D |
| 58 | 0.562 | 002542D |
| 59 | 0.587 | 002607D |
| 60 | 0.631 | 003061D |
| 61 | 0.666 | 003146D |
| 62 | 0.701 | 003401D |
| 63 | 0.735 | 003465D |
| 64 | 0.770 | 003560D |
| 65 | 0.805 | 004005D |
| 66 | 0.839 | 004071D |
| 67 | 0.874 | 004164D |
| 68 | 0.908 | 004410D |

-continued

| B′ VALUES | | |
| --- | --- | --- |
| API° | B′ DIGITAL VALUE | OCTAL NUMBER FOR PROGRAM |
| 69 | 0.943 | 004503D |
| 70 | 0.978 | 004570D |
| 71 | 1.012 | 010022D |
| 72 | 1.047 | 010107D |
| 73 | 1.082 | 010202D |
| 74 | 1.116 | 010426D |
| 75 | 1.151 | 010521D |
| 76 | 1.186 | 010606D |
| 77 | 1.220 | 011040D |
| 78 | 1.256 | 011126D |
| 79 | 1.289 | 011211D |
| 80 | 1.324 | 011444D |
| 81 | 1.359 | 011531D |

THE DEVICE FLEXIBILITY:

In the metered liquid dispenser art, the present invention is virtually unlimited in construction and application, depending upon one's knowledge of industrial requirements, imagination, or developments abroad which, if not mentioned, might prove an erroneous oversight. The tremendous potential the invention presages as an instrument for conservation of petroleum products among other resources is due to its inherently greater accuracy over contemporary dispensing devices.

The United States of America is a signatory to the International Organization for Standardization (ISO), which organization through its ISO/TC 28/SC3 (Technical Committee 28, Sub-Committee 3) has proposed a different formula for consideration, as an international standard, modifying only slightly ISO R 91 (D-1250). Should such a change be adopted, the computer of the present invention could very readily be re-programmed to accept it.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In apparatus for the transfer of liquid in terms of standard volume at a standard temperature, having a delivery conduit with an outlet delivery means, and means for moving the liquid through said outlet delivery means, the combination of:

thermometric means in said outlet delivery means for sensing continuously the instantaneous temperature of the liquid there and continuously deriving an analogous electrical signal therefrom, signal transmitting means connected to said thermometric means for generating a thermal value electrical signal, corresponding to the sensed temperature, from said analogous electrical signal and for sending said thermal value electrical signal several times per second, upon command, metering means at said outlet delivery means for generating and sending, upon command, at least as often as said signal transmitting means, volume electrical signals corresponding to volume of liquid transferred through said outlet delivery means, rapid electronic computing means for repetitively commanding and receiving said volume signals and said thermal value signal, for incrementally calculating therefrom at intervals of several times per second during a delivery of liquid the volume delivered in each interval as corrected to said standard temperature, and for summing the total volume from initiation of each delivery through the latest calculated interval, and volume display means actuated by said computing means for continuously displaying the computed summed volume of dispensed liquid in terms of standard measure at said standard temperature.

2. The apparatus of claim 1 wherein said computing means includes means for storing pricing information for said liquid and for computing the price of said computed summed volume of dispensed liquid, said apparatus additionally comprising price display means actuated by said computing means for displaying said computed price.

3. The apparatus of claim 1 wherein said metering means generates said volume electrical signals continuously.

4. In apparatus for the retail delivery and sale of liquid in terms of standard volume at a standard temperature, having a liquid storage tank, a delivery conduit with an outlet delivery means, and means for moving the liquid from said tank to and through said conduit, the combination:

thermometric means in said outlet delivery means for sensing the instantaneous temperature of the liquid there, and continuously deriving an analogous electrical signal therefrom, signal transmitting means connected to said thermometric means for generating a thermal value electrical signal, corresponding to the sensed temperature, from said analogous electrical signal and sending said thermal value electrical signal several times per second, upon command, metering means at said outlet delivery means for generating and sending upon command, at least as often as said signal transmitting means, volume electrical signals corresponding to volume of liquid transferred the combination therewith of, rapid electronic computing means for repetitively commanding and receiving said volume signals and said thermal value signal, for incrementally calculating therefrom at intervals of several times per second during a delivery of liquid the volume delivered as corrected to said standard temperature, and for summing said increments into the total volume from initiation of delivery through the latest said interval, and volume display means actuated by said computing means for continuously displaying the computed summed volume of dispensed liquid in terms of standard measure at said standard temperature.

5. The apparatus of claim 4 wherein said computing means includes means for storing pricing information for said liquid and for computing the price of said computed summed volume of dispensed liquid, said apparatus additionally comprising price display means actuated by said computing means for displaying said computed price.

6. In apparatus for the retail delivery and sale of liquid in terms of standard volume at a standard temperature, having a liquid storage tank, a delivery conduit with an outlet delivery means, and means for moving the liquid from said tank to said conduit, the combination therewith of:

thermometric means in said outlet delivery means for sensing the instantaneous temperature of the liquid there, signal transmitting means connected to said thermometric means for generating a thermal value electrical signal corresponding to the sensed temperature, and sending said thermal value electrical signal several times per second, upon command, a metering device having a rotating shaft and shaft encoder means for generating and sending upon command, at least as often as said signal transmitting means, positive angle electrical signals corresponding directly to the shaft-angle rotation of said shaft and therefore to the volume of liquid transferred through said metering device, rapid electronic computing means for repetitively commanding and receiving said positive angle volume signals and said thermal value signal, for incrementally calculating therefrom at intervals of several times per second during a delivery of liquid the volume delivered as corrected to said standard temperature, and for summing the total volume from initiation of delivery through the latest calculated interval, and volume display means actuated by said computing means for continuously displaying the computed summed volume of dispensed liquid in terms of standard measure at said standard temperature.

7. The apparatus of claim 6 wherein said computing means includes means for storing pricing information for said liquid and for computing the price of said computed summed volume of dispensed liquid, said apparatus additionally comprising price display means actuated by said computing means for displaying said computed price.

8. In apparatus for delivery of liquid in terms of standard volume at a reference temperature, through a delivery conduit having a delivery locus, the combination of:

switch means for providing a digital signal indicating the event of commencement of flow and the event of cessation of flow of said liquid through said conduit, temperature measurement means including a sensor in said delivery conduit at a point adjacent to said delivery locus, and signaling means for providing a digital electrical temperature signal corresponding to the instantaneous temperature of said liquid at said sensor, a metering means for measuring the quantity of said liquid that has passed through said conduit since said event of commencement and for providing at least as often as said signaling means digital electrical liquid delivery signals corresponding to the amount of said liquid delivered from said delivery locus, said metering means comprising a shaft-angle encoder mechanically linked to said meter, digital computer means connected to said switch means, said metering means, and said temperature measurement means, for repetitively calculating from said liquid delivery signals and said temperature signal at frequent intervals between said commencement and cessation of flow the accumulated quantity of liquid delivered corrected to said reference temperature, said computer means including calibration means for relating the rotation of said shaft-angle encoder to actual flow of said liquid through said locus, said calibration means comprising a setswitch for setting the volume-to-revolution ratio of said flow to said encoder, and digital quantity display means connected to said computer for displaying said corrected accumulated quantity of said liquid delivered.

9. The apparatus of claim 8 wherein said metering means sends its liquid delivery signals continuously.

10. The apparatus of claim 9 wherein said shaft-angle encoder is an optical encoder.

11. In apparatus for delivery of liquid, in terms of standard volume at a reference temperature, through a delivery conduit having delivery locus, the combination of:

switch means for providing a signal indicating the event of commencement of flow and the event of cessation of flow of said liquid through said conduit, metering means for measuring the quantity of said liquid that has passed through said conduit since said event of commencement and for providing an electrical liquid delivery signal corresponding to the amount of said liquid delivered from said delivery locus, temperature measurement means including a sensor in said delivery conduit at a point adjacent to said delivery locus, and signaling means for providing an electrical temperature signal corresponding to instantaneous temperature of said liquid at said sensor, flow signal translation means connected to said metering means for translating said electrical liquid delivery signal into digital flow signals, and sending them upon command, temperature signal translation means connected to said temperature measurement means for translating said electrical temperature signal into digital temperature signals and sending them upon command, digital processor and storage means connected to said switch means, said flow signal translation means, and said temperature signal translation means, for receiving by command and for repetitively calculating from said digital flow signals and said digital temperature signals at frequent intervals between said commencement and cessation of flow the accumulated quantity of said liquid delivered, as corrected to said reference temperature, said digital processor and storage means being wired to calculate said accumulated quantity of said liquid delivered by (1) determining the incremental volume delivered during each said interval between calculations (2) multiplying said incremental volume by the sum of (a) one plus (b) the product of a temperature differential (being the temperature signal minus said reference temperature) and a first predetermined constant, plus (c) a second predetermining constant times the square of said temperature differential, to obtain an incremental calculation, and thence (3) summing said incremental calculations at each said interval during each said delivery of said liquid, and digital quantity display means connected to said processor and storage means for displaying said corrected accumulated quantity of said liquid delivered.

12. The apparatus of claim 11 additionally comprising a digital temperature display connected to said temperature measurement means for displaying said sensed instantaneous gasoline temperature as at the latest determination thereof.

13. The apparatus of claim 11 wherein said metering means sends its liquid delivery signal continuously.

14. The apparatus of claim 11 wherein said flow signal translation means is integral with said metering means, and said signal of said switch means is digital.

15. The apparatus of claim 11 additionally comprising digital cassette recorder means connected to said computer means for recording digitally for each delivery said corrected accumulated quantity of gasoline delivered.

16. The apparatus of claim 11 wherein said digital quantity display means includes an array of electromagnetic reflective discs.

17. The apparatus of claim 11 wherein said digital processor and storage means includes a unit price digital input and means for calculating accumulated price on the basis of quantity of liquid delivered corrected to said standard temperature, and further comprising digital price display means connected to said digital processor and storage means for displaying said accumulated price.

18. The apparatus of claim 17 wherein said digital quantity display means and said digital price display means include plural arrays of electromagnetic reflective discs.

19. The apparatus of claim 11 additionally comprising remote terminal means connected to said computer means for instructing said computer means and for obtainind digital information therefrom.

20. The apparatus of claim 19 wherein said remote terminal means includes means for selectively recalling data stored in said computer means, means for receiving said recalled data, and means for storing said recalled data.

21. The apparatus of claim 20 wherein said means for storing said recalled data accumulates data received selectively from time to time from said computer means.

22. In apparatus for delivery of liquid, in terms of standard volume at a reference temperature, through a delivery conduit having delivery locus, the combination of:

switch means for providing a signal indicating the event of commencement of flow and the event of cessation of flow of said liquid through said conduit.

metering means for measuring the quantity of said liquid that has passed through said conduit since said event of commencement and for providing an electrical liquid delivery signal corresponding to the amount of said liquid delivered from said delivery locus, temperature measurement means including a sensor in said delivery conduit at a point adjacent to said delivery locus, and signaling means for providing an electrical temperature signal corresponding to instantaneous temperature of said liquid at said sensor, flow signal translation means connected to said metering means for translating said electrical liquid delivery signal into digital flow signals, temperature signal translation means connected to said temperature measurement means for translating said electrical temperature signal into digital temperature signals, digital processor and storage means connected to said switch means, said flow signal translation means, and said temperature signal translation means, for repetitively calculating from said digital flow signals and said digital temperature signals at frequent intervals between said commencement and cessation of flow the accumulated quantity of said liquid delivered, as corrected to said reference temperature, said digital processor and storage means being wired to calculate said accumulated quantity of said liquid delivered by (1) determining the incremental volume delivered during each said interval between calculations (2) multiplying said incremental volume by the sum of (a) one plus (b) the product of a temperature differential (being the temperature signal minus said reference temperature) and a first predetermined constant, plus (c) a second predetermining constant times the square of said temperature differential, to obtain an incremental calculation, and thence (3) summing said incremental calculations at each said interval during each said delivery of said liquid, and digital quantity display means connected to said processor and storage means for displaying said corrected accumulated quantity of said liquid delivered, said metering means comprising a shaftangle encoder mechanically linked to said metering means and said computer additionally comprises calibration means for relating the rotation of said encoder to actual flow, said calibration means comprising a setswitch for setting the volume-to-revolution ratio of said flow to said encoder.

23. The apparatus of claim 22 wherein said encoder is of the optical type.

24. In apparatus for sale of gasoline in terms of standard gallons at a reference temperature said apparatus having a gasoline storage reservoir, a delivery conduit, and means creating a pressure differential for moving gasoline from said reservoir through said conduit to a delivery locus, the combination therewith of:

metering means having a shaft that is rotated by the flow of said gasoline in said conduit, temperature measurement means including a sensor in said delivery conduit at a point adjacent said delivery locus, said means for providing, upon command, several times per second a digital electrical temperature signal corresponding to instantaneous gasoline temperature at said sensor, a switch for providing a digital signal indicating the time of commencement and the time of cessation of flow of gasoline in said conduit, analog-to-digital generation means for providing, upon command, at least as frequently as said temperature measurement means, digital electrical flow signals corresponding to the positive angle of rotation of said shaft and therefore to the amount of flow of said gasoline in said conduit, a digital computer connected to command and receive signals from said metering means, said temperature measurement means, and said switch, for repetitively calculating from said flow signals and said temperature signal, at intervals of several times per second, between said commencement and cessation of flow the accumulated quantity of gasoline delivered corrected to said reference temperature, and digital quantity display means connected to said computer for displaying said corrected accumulated quantity of gasoline delivered.

25. The apparatus of claim 24 including altering means for changing the units of measurement from gallons to standard international (S.I.) units.

26. The apparatus of claim 25 wherein said altering means comprises a plurality of thumb-operated wheel switches.

27. In apparatus for the retail delivery and sale of gasoline in terms of standard gallons at 60° F., said apparatus having a gasoline storage tank, a delivery hose with a nozzle, and pump means for moving gasoline from said tank to said nozzle, the combination therewith of:

thermometric means in said nozzle for sensing continuously the instantaneous temperature of the gasoline passing through said nozzle during delivery, signal transmitting means actuated by said thermometric means for generating and sending, upon command, several times each second during delivery a thermal value electrical signal therefrom, metering means for generating, and sending, upon command, at least as often as said signal transmitting means, electric gallonage signals for the gasoline passing through said nozzle, rapid electronic computing means storing price information, for commanding said signal transmitting means and said metering means, for receiving said gallonage signals and said thermal value signals, for computing therefrom at frequent repetitive intervals updated for each said thermal value signal, the total gallonage delivered up through them corrected to standard gallons at 60° F., and for computing concurrently the price for the gallonage delivered, and display means actuated by said computing means for displaying the computed dispensed gallons in terms of standard gallons at 60° F. and the money price thereof.

28. The apparatus of claim 27 including means for altering the units of volume and of price.

29. A method for the delivery of liquid in terms of a standard unit of measurement at a standard reference temperature comprising the steps of:

determining several times per second the instantaneous temperature of the liquid at the point of delivery, generating and transmitting, upon command, several times per second a thermal value electrical signal corresponding to said instantaneous temperature, generating and transmitting, upon command, at least as often as said thermal value electrical signals, quantity electrical signals corresponding to the number of said standard units delivered, commanding the transmission of said thermal value electrical signal and said quantity electrical signals several times per second, electronically computing from said quantity signals and said thermal value signal, each time said thermal value signal is transmitted, the quantity in said standard units as corrected to said standard reference temperature, and displaying during and after delivery the computed dispensed quantity in terms of standard units at said standard reference temperature.

30. The method of claim 29 having the additional step of displaying the money price thereof in terms of said standard units at said standard reference temperature.

31. A method for the delivery of liquid in terms of a standard unit of volume at a standard reference temperature, comprising the steps of:

determining the instantaneous temperature of the liquid at the point of delivery, generating and transmitting, upon command, several times per second a thermal value signal corresponding to said instantaneous temperature, generating and transmitting, upon command, at least as often as said thermal value signal, quantity electrical signals corresponding to the volume delivered, by causing a meter shaft to rotate and encoding the angular displacement of said shaft to the volume delivered, electronically commanding said transmissions and computing from said quantity signals and said thermal value signal the quantity in said standard units corrected to said standard reference temperature, and displaying during and after delivery the computed dispensed quantity in terms of said standard units at said standard reference temperature.

32. The method of claim 31 having the additional step of displaying the money price thereof in terms of standard units at said standard reference temperature.

33. A method for the sale of gasoline in terms of standard gallons at 60° F., comprising the steps of:

determining the instantaneous temperature of the gasoline in a dispensing nozzle, generating and transmitting several times per second a thermal value signal corresponding to said instantaneous temperature therefrom, generating and transmitting at least as often as said thermal value signal, a gallonage signal corresponding to the gallons delivered, electronically computing several times per second from said gallonage signal and said thermal value signal, the gallonage corrected to standard gallons at 60° F., according to the formula $$V_{ST} = (1 + A'\overline{\Delta T} + B'\overline{\Delta T}^2)\, V_T,$$

where $V_{ST}$ = the gallons at 60° F., $V_T$ = the gallons at the temperature of the gasoline at the point of delivery, $\overline{\Delta T} = V_{ST} - V_T$, and A′ and B′ are experimentally obtained coefficients, and displaying the computed dispensed gallons in terms of standard gallons at 60° F.

34. The method of claim 33 including also the step of displaying the money price thereof in terms of standard gallons at 60° F.

35. A method of calculating the volume of delivery of a liquid of known density at a reference temperature at a delivery point utilizing a delivery conduit carrying said liquid to said delivery point, including the steps of:

rotating a metering shaft by the flow of said liquid in said conduit, continuously generating from said shaft a positive angle electrical digital flow signal corresponding to the rate of rotation of said shaft and therefore of the amount of flow of said liquid, and providing said digital flow signal several times per second, upon command, continuously measuring the temperature of said liquid in said conduit near said delivery point, providing, upon command, several times per second a digital electrical temperature signal corresponding to the temperature of said liquid, commanding and determining several times per second the difference between said temperature signal and said reference temperature, commanding and determining the difference in volume of said liquid at said measured temperature and at said reference temperature, calculating the incremental corrected volume of said liquid delivered during the interval between successive temperature signals, as determined from said volume difference and said flow signal, storing said incremental corrected volumes, repeatedly calculating several times per second said incremental corrected volume for each said increment during the duration of a said delivery of said liquid, accumulating all said stored incremental corrected volumes during said delivery to provide said total corrected volume of liquid delivered, and displaying said accumulation in terms of units of volume of said liquid at said reference temperature.

36. The method of claim 35 comprising the additional step of sequentially recording all said accumulations.

37. The method of claim 36 comprising the additional step of transmitting said accumulations to a remote location upon receipt of an accumulation playback control signal from said remote location.

38. The method of claim 37 including the step of summing all said transmitted accumulations received from time to time at said remote location.

39. In an apparatus for the retail sale of gasoline in terms of a defined unit of liquid volume, said apparatus having a gasoline storage tank, a delivery hose with a nozzle and means creating a pressure differential for moving gasoline from said tank to said hose, the combination therewith of:

a metering device having a rotating shaft and means for generating and sending, upon command, an electric liquid volume signal as a direct function of the positive angular displacement of said shaft, rapid electronic computing means for commanding and receiving said electric liquid volume signal and for computing therefrom, as the product of the sum of the defined units of liquid volume, multiplied by their unit price, the selling price, and display means, actuated by said computing means, for displaying the total defined units of liquid volume delivered and for displaying the money price thereof.

40. The combination of claim 39 having means for adjusting said volume and price to correct for variations of temperature from a standard temperature.

41. In apparatus for the transfer of liquid in terms of standard volume at a standard temperature, having a delivery conduit with an outlet delivery means, and means for moving the liquid through said outlet delivery means, the combination of:

thermometric means in said outlet delivery means for sensing continuously the instantaneous temperature of the liquid there, signal transmitting means at said thermometric means for generating several times per second a thermal value electrical signal corresponding to the sensed temperature, metering means at said outlet delivery means for generating at least as often as said signal transmitting means volume electrical signals corresponding to volume of liquid transferred through said outlet delivery means, rapid electronic computing means for repetitively receiving said volume signals and said thermal value signal, for incrementally calculating therefrom at intervals of several times per second during a delivery of liquid the volume delivered in each interval as corrected to said standard temperature, and for summing the total volume from initiation of each delivery through the latest calculated interval, and volume display means actuated by said computing means for continuously displaying the computed summed volume of dispensed liquid in terms of standard measure at said standard temperature, said metering means comprising a rotating shaft to which flow measuring means is attached and shaft-angle encoding means mechanically connected to said shaft for generating said signal, said metering means comprising a shaft-angle encoder mechanically linked to said meter, said computer means including calibration means for relating the rotation of said shaft-angle encoder to actual flow of said liquid through said locus, said calibration means comprising a setswitch for setting the volume-to-revolution ratio of said flow to said encoder.

42. In apparatus for the transfer of liquid in terms of standard volume at a standard temperature, having a delivery conduit with an outlet delivery means, and means for moving the liquid through said outlet delivery means, the combination of:

thermometric means in said outlet delivery means for sensing continuously the instantaneous temperature of the liquid there, signal transmitting means at said thermometric means for generating several times per second a thermal value electrical signal corresponding to the sensed temperature, metering means at said outlet delivery means for generating at least as often as said signal transmitting means volume electrical signals corresponding to volume of liquid transferred through said outlet delivery means, rapid electronic computing means for repetitively receiving said volume signals and said thermal value signal, for incrementally calculating therefrom at intervals of several times per second during a delivery of liquid the volume delivered in each interval as corrected to said standard temperature, and for summing the total volume from initiation of each delivery through the latest calculated interval, means for causing said computing means to calculate said accumulated quantity of gasoline delivered by (1) incrementally calculating delivered volume, (2) multiplying a said incremental flow signal times the sum of (a) one plus (b) the product of a temperature differential (being the temperature signal minus said reference temperature) and a predetermined constant, plus (c) the product of a second constant times the square of said temperature differential, and thence (3) accumulating the incremental calculations for the duration of each said delivery of gasoline, and volume display means actuated by said computing means for continuously displaying the computed summed volume of dispensed liquid in terms of standard measure at said standard temperature.

43. In apparatus for the retail sale of gasoline in terms of standard gallons at 60° F., said apparatus having a gasoline storage tank, a delivery hose with a nozzle, and means creating a pressure differential for moving gasoline from said tank to said hose, the combination therewith of:

a metering device having a rotating shaft and shaft-angle encoder means for generating and sending, upon command, an electric gallonage signal as a direct function of the positive angular displacement of said shaft, thermometric means for sensing the instantaneous temperature of the gasoline in said nozzle, signal transmitting means actuated by said thermometric means for generating and sending, upon command, a thermal value electrical signal therefrom, rapid electronic computing means for commanding said metering device and said signal transmitting means, for receiving said gallonage signal and said thermal value signal, and for computing therefrom at least as often as four times per second the gallonage corrected to standard gallons at 60° F., and display means actuated by said computing means for displaying the computed dispensed gallons in terms of standard gallons at 60° F., and for displaying the money price thereof in terms of standard gallons at 60° F.

* * * * *